United States Patent [19]

Burke et al.

[11] Patent Number: 4,495,647
[45] Date of Patent: Jan. 22, 1985

[54] DIGITAL VOICE STORAGE MOBILE

[75] Inventors: Timothy M. Burke, Fort Worth; Paul F. Smith, North Richland Hills; Scott W. Noble; Eric R. Schorman, both of Bedford, all of Tex.

[73] Assignee: Motorola, Inc., Schaumburg, Ill.

[21] Appl. No.: 447,373

[22] Filed: Dec. 6, 1982

[51] Int. Cl.³ .............................................. H04B 7/24
[52] U.S. Cl. ..................... 455/38; 340/825.44; 340/825.52; 340/825.54; 370/93; 455/4; 455/5; 455/54
[58] Field of Search ....................... 455/38, 53, 54, 56, 455/3-6; 370/61, 92, 93, 96; 179/2 E, 2 EA, 2 EB, 2 EC; 381/36, 40, 41, 43; 340/825.44, 825.45, 825.48, 825.52, 825.54, 825.55

[56] References Cited

U.S. PATENT DOCUMENTS

| 3,641,496 | 2/1972 | Slavin . | |
| 3,694,811 | 9/1972 | Wood . | |
| 3,706,929 | 12/1972 | Robinson . | |
| 3,710,313 | 1/1973 | Kimball et al. . | |
| 3,803,358 | 4/1974 | Schirf et al. . | |
| 3,808,591 | 4/1974 | Panicello et al. . | |
| 3,846,783 | 11/1974 | Apsell et al. | 340/311.1 |
| 3,996,554 | 12/1976 | Ives et al. . | |
| 4,060,848 | 11/1977 | Hyatt | 364/200 |
| 4,117,263 | 9/1978 | Yeh . | |
| 4,131,849 | 12/1978 | Freeburg . | |
| 4,181,813 | 1/1980 | Marley . | |
| 4,182,989 | 1/1980 | Endó et al. | 455/56 |
| 4,209,836 | 6/1980 | Wiggins, Jr. et al. | 364/718 |
| 4,232,390 | 11/1980 | McEvilly, Jr. | 455/77 |
| 4,255,618 | 3/1981 | Danner et al. . | |
| 4,330,780 | 5/1982 | Masaki | 340/825.44 |

FOREIGN PATENT DOCUMENTS 0137739 10/1980 Japan ................................. 455/54

OTHER PUBLICATIONS

"Series 1600 Solid State Voice Storage Unit", Publication by RACOM Out of the Mobile Times/Jun. 1980.
Motorola Catalog Insert—"Portable Receiver/Recorder", Sec. 8.6, Item #01. (From Motorola Equipment Catalog R3).
"RESCU" Emergency Location Alerting System—A Product of The Antenna Specialists Co.
"Bosch Technische Information", German Publication (EK-VKD 8 699921059) (040/5).

Primary Examiner—Marc E. Bookbinder
Attorney, Agent, or Firm—F. John Motsinger; Edward M. Roney; James W. Gillman

[57] ABSTRACT

A digital voice storage mobile control terminal adapted for use in multiple unit land mobile radio communications system. The mobile control terminal utilizes up to eight 64K dynamic RAMs to store up to 42 seconds of speech comprising up to eight separate messages as well as a CVSD encoder-decoder to digitize speech messages.

6 Claims, 18 Drawing Figures

DIGITAL VOICE STORAGE MOBILE

BACKGROUND OF THE INVENTION

1. Field of the Invention

This invention relates generally to voice/data communications systems and in particular to apparatus and techniques for a digital voice storage mobile radio control terminal adapted for use in a multi-unit land mobile radio communications system.

2. Description of the Prior Art

The prior art includes various types of radio frequency transmission systems of the general type which serve to effect a selective transmission from or to an emergency vehicle or purposes of generating a warning transmission. Conventional systems typically utilize magnetic tape or wire for the storage of the desired message and utilize conventional playback arrangements. However, use of such conventional systems in many applications present substantial difficulties due to the environment, weight, and size limitations imposed by such applications. In addition, automatic record and playback devices are known in the prior art, such as with telephone answering systems, that answer with recorded instructions on a first magnetic tape, then record a telephone message on a second magnetic tape. Somewhat similar systems for recording a received message at a mobile or pre-recording a message to be transmitted in response to remote activation, are utilized in multi-unit mobile radio communications systems. These electromechanical systems are typically bulky, unreliable, and inflexible. Also, these prior art arrangements only provide sequential access for generating fixed messages. Therefore, many potential applications have not been feasible in the prior art due to the limitations of these systems.

SUMMARY OF THE INVENTION

It is therefore an object of the invention to provide a solid state voice storage mobile radio control terminal utilizing digital voice storage and adapted for use in a multi-unit land mobile communications system.

It is another object of the invention to provide a voice storage mobile radio control terminal capable of multiple message storage and non-sequential access.

It is yet another object of the invention to provide a voice storage mobile radio control terminal for a multiple unit land mobile communications system with emergency remotely triggered recorded message transmission capability.

Briefly, according to the invention, a radio control terminal for a secondary station in a multi-unit communications system for voice and data communications is provided. The communication system includes a primary station and a plurality of secondary stations, with each secondary station having a microphone to permit input of voice messages by the operator. The control terminal comprises digitizing circuitry for digitizing a voice message entered by the operator and memory circuitry for storing the digitized voice message. In addition, the control terminal comprises conversion circuitry for connecting the digitized stored message to analog form and transmission means for transmitting converted stored messages to the primary station.

BRIEF DESCRIPTION OF THE DRAWINGS

The features of the present invention which are believed to be novel are set forth with particularity in the appended claims. The invention, together with further objects and advantages thereof, may best be understood by reference to the following description when taken in conjunction with the accompanying drawings.

BRIEF DESCRIPTION OF THE PREFERRED EMBODIMENT

Figure 1:
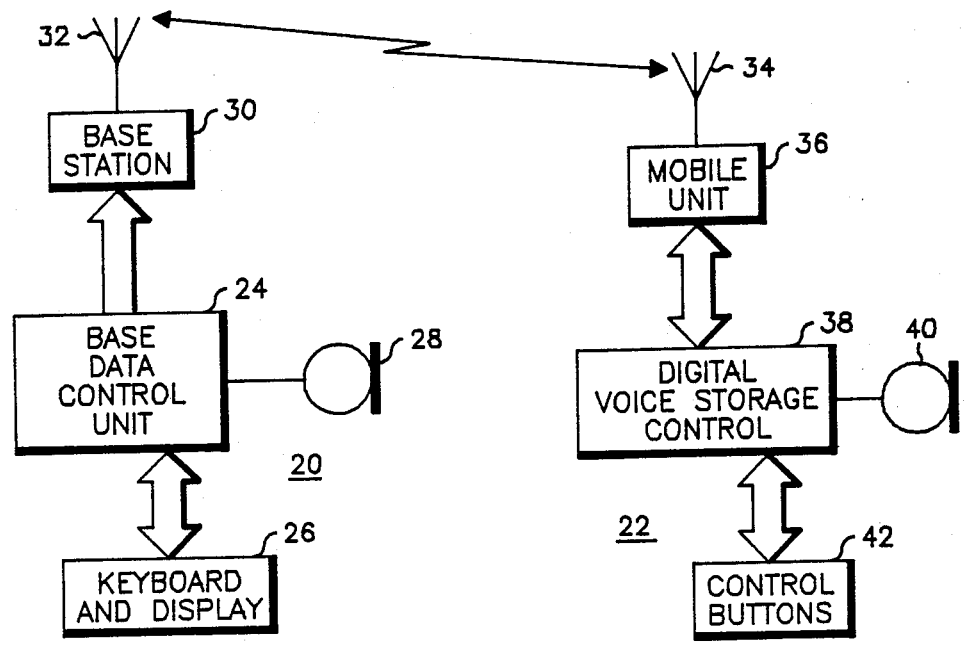
FIG. 1 is a block diagram of a radio communications system incorporating a digital voice storage mobile control terminal according to the invention.

In FIG. 1, there is shown a block diagram of a radio communications system that utilizes both data signals and voice signals between a primary (base) station 20 and at least one secondary (mobile) station 22. The radio system illustrated also incorporates the novel digital voice storage mobile control terminal of the invention. The system is processor based such that all of the control operations and signalling are performed in software, allowing a portable and modular system. Such a voice/data communications system is disclosed in detail in a co-pending application bearing Ser. No. 402,687, filed July 28, 1982 by Timothy Burke, and assigned to Motorola, Inc. The system illustrated includes a base data control unit 24 identical to that disclosed in the above-mentioned co-pending application with some software modifications to be desribed hereinafter. The base data control unit 24 includes a keypad and display 26 to permit operator control and monitoring of functions, and a microphone 28 or voice input.

The base data control unit 24 is coupled as shown to a base transceiver 30 which includes an antenna 32. Either voice communications or data communications are established with the mobile station via RF transmission. The mobile station illustrated includes an antenna 34 coupled to a mobile transceiver 36 which is coupled to a mobile unit digital voice storage control circuit 38. The mobile digital voice storage control terminal 38 includes a microphone 40 and a set of control buttons 42 to permit the operator to control the digital voice storage functions.

The signalling used is a 600 bit per second PSK modulation signal with a 1500 hertz carrier. Data transfers are accomplished in packets of 32 bits that are synchronized through a 40 bit, dual phase optimized code word. A rate one-half convolution threshold decoder is used for error correction and a 16 bit inverted-CCITT cyclical redundancy code is used for message error detection. The command data packets contain status information, commands, and address information corresponding to a particular mobile unit.

Figure 2:
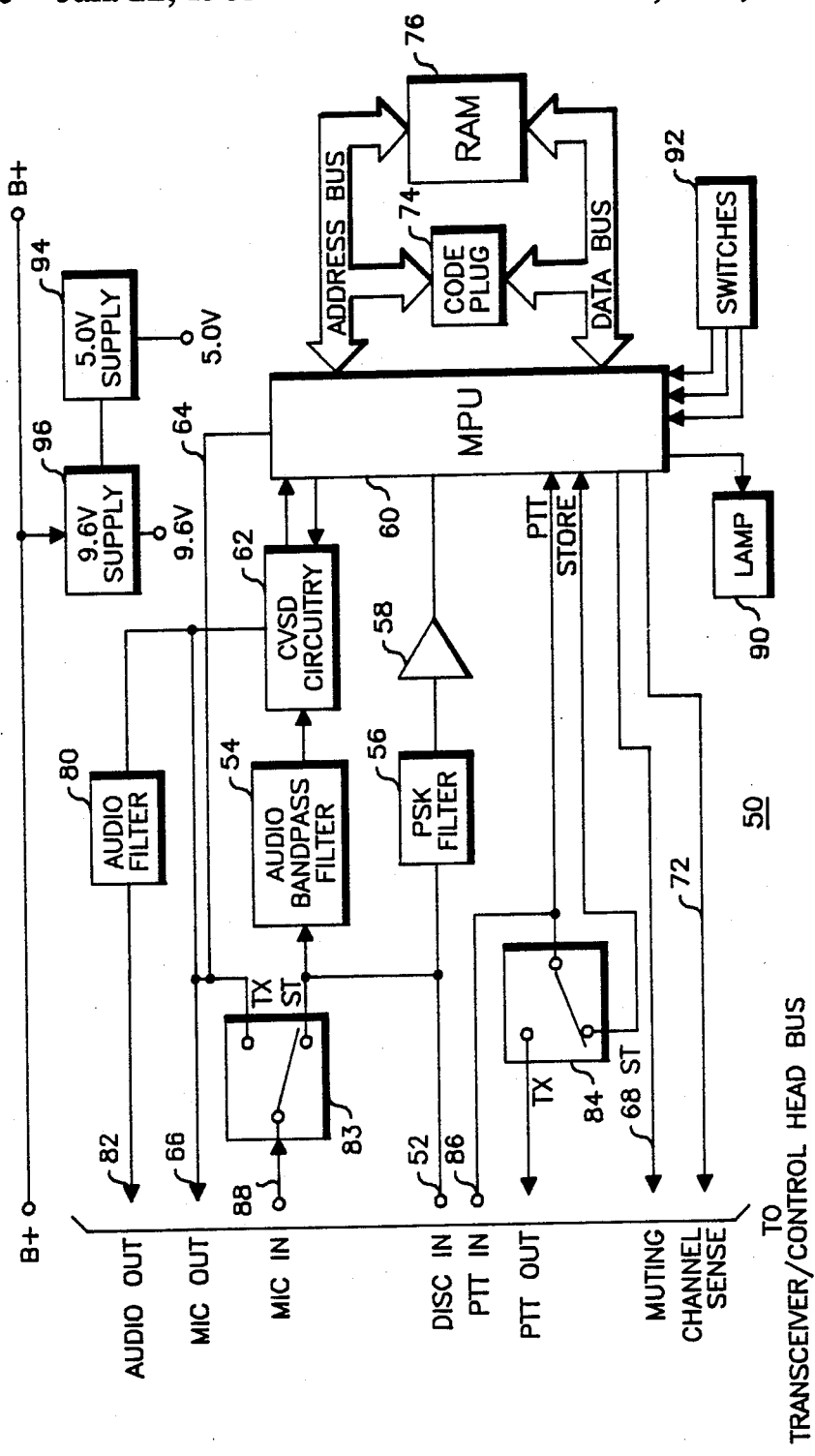
FIG. 2 is a block diagram of the mobile digital voice storage control circuit according to the invention.

Referring now to FIG. 2, there is shown a block diagram of the mobile digital voice storage control terminal according to the invention for use in conjunction with a mobile transceiver as illustrated in FIG. 1. The mobile unit 50 consists primarily of a microcomputer 60 (e.g., in the preferred embodiment a Motorola MC3870), up to eight 64k dynamic random access memories (e.g., a Motorola MCM6664) and supporting digital and analog circuitry. The unit can store up to 42 seconds of speech, comprising up to 8 unique messages. The processor 60 performs all of the PSK modulation, demodulation, encoding and decoding of the signalling, and all the control and management functions of the mobile system.

Incoming data is applied from a receiver detector (not shown) in analog form to the discriminator input 52, and then coupled, as shown, to an audio bandpass filter 54 and a PSK bandpass filter 56. The PSK filter 56 removes unwanted signals and receiver noise, and couples the filtered signal to a limiter 58 where the signal is limited, and then coupled to the MPU 60 for processing and decoding. The microprocessor 60 performs coherent detection of the PSK signal recovering the command data packets which provide the command and control information for the mobile unit 50. The audio bandpass filter 54 filters audio voice signals and couples the filtered speech signal to a continuously variable slope delta modulation (CVSD) encoder decoder circuit 62 which, in conjunction with the MPU 60 digitizes the incoming speech signal. This circuit 62 is also used to reconstruct speech on playback. (at a sample rate of 12.346 kilohertz in the preferred embodiment).

Data to be transmitted is prepared in the MPU 60 in command data packets and coupled as PSK modulated packets from the output 64 to the microphone output 66, to the radio transmitter. The microphone (not shown) is muted during data transmission to prevent any voice interference. Radio muting is controlled by the MPU 60 via the output 68, and tone generation is performed by the MPU 60 in conjunction with CVSD circuit 62 and the filter 80, and coupled to the audio output 82, and to microphone output 66, as shown. Channel sensing is also performed by the MPU 60 via the conductor 72. A code plug 74 is coupled, as shown, to the MPU 60, and contains all of the system information on selected options of the digital voice storage unit 50. The data in the code plug 74 is read by the MPU 60 and then used in the control of the operation of the mobile digital voice storage unit 50. A random access memory (RAM) 76 is also coupled to the MPU 60, as shown, composed of up to eight dynamic 64K RAMS to provide storage for up to 42 seconds of digital voice storage. An audio filter 80 is coupled to the CVSD circuit 62 to provide smoothing of the reconstructed speech from the CVSD circuit 62 and the resulting smooth speech signal is coupled to the output 82, as shown. A microphone switch 83, which is part of a STORE function switch, is provided to couple speech from the microphone input 88 to the audio bandpass filter 54 during the storing of speech, and to couple speech to the transmitter (not shown) during transmission. In addition, a switch 84 couples the PTT signal to the MPU 60 from the input 86 during storage of speech, while coupling the PTT signal to the transceiver/control head bus (see FIG. 1) during transmission. A message indicator lamp 90 is coupled to the MPU 60, as shown, to provide an indication of a stored message to the operator. A set of three switches 92 is also coupled to the MPU 60 to permit the operator to select PLAY, REPLAY, and SEND modes of the digital voice storage operation. The mobile digital voice storage unit 50 also requires a regulated five volt power supply 94 and a regulated 9.6 volt power supply 96, as shown.

The mobile digital voice storage memory is organized in blocks of approximately 166 milliseconds of recorded speech in the preferred embodiment in order to increase addressing speed. In addition, messages are stored in a first in first out (FIFO) queue. To do this without moving large amounts of data in the microprocessor 60, a circular message table is utilized with pointers and lags and with eight addresses to permit eight separate messages. One pointer points at all time to the location in the message table of the most recent message. In addition, three flags are used to indicate the status of each message. These flags are labeled PRESNT, ACTIVE, and STFWD to represent present, active, and store and forward messages. A message is present as long as it is intact in the voice memory. A normally recorded message from the base is active (and present) until it is reviewed by the mobile at which time it is present only. A message is present, and store and forward (STFWD) if it is recorded by the mobile operator to be forwarded to the base.

When a record command is received, the PRESNT flag is examined. If no messages are present, the start address for the recording is set to the beginning of the RAM, but if other messages are present, the new message will be recorded starting at the end of the most recent message. Once the recording stops, the start and stop addresses are placed in the message table and flags are reset for overwritten messages. If a message is partially overwritten, the start address for the message is adjusted to the new message stop address.

In general, a new message is allowed to overwrite all prior messages. An exception is made in the case of store and forward messages originated by the mobile operator. It is necessary to prevent a mobile operator from destroying base originated messages which he has not yet reviewed. If the mobile's message lamp 90 is on, indicating that one or more messages has not been reviewed, the operator will not be allowed to create a store and forward message. If he activates the store mode, beeps will sound until he releases the store button. If he does not release the store button, the beeps will stop after 15 seconds, but will restart if the PTT is pushed, and no recording will be permitted until the base message has been reviewed. The store mode allows the operator to append speech segments to longer messages by using the PTT to start and stop the recording. After the PTT is released, the message is played back automatically. If the mobile operator creates a stored message that fills the voice memory, beeps will sound until the PTT is released at which time the entire message will be played back. If the operator depresses the PTT again, with the store button still pushed, the entire store and forward message will be erased. This provides a convenient method for erasing a store and forward message.

In operation, a base initiated voice storage sequence begins with the base transmission of a command packet including command and address information identifying the mobile unit or units called depending upon whether the address indicates a unit, group or fleet. The base may, optionally, determine the time remaining for the storage and the total storage time by transmitting the appropriate command packet. To store a message with the recorder, the operator sends a command data packet instructing the mobile unit to record the transmission, and then proceeds to talk normally. Upon receiving the record instruction, the mobile unit starts an analog to digital conversion and stores the converted data in the RAM. While recording, the mobile digital voice storage unit does not have time to decode a stop command packet. Thus, a turn off code (at 1543 hertz in the preferred embodiment) is transmitted by the base station when the operator releases the PTT, which is detected by the mobile digital voice storage unit terminating the recording. To let the mobile operator know that a message is waiting to be reviewed, a message light 90 is turned on at the mobile unit. The light goes out when the last base message is reviewed by the mobile operator.

The mobile operator can review the recorded message, as well as all messages recorded before or after it. A PLAY switch, which is a momentary switch, will allow the user to sequence through the messages stored, and play them through the normal receive audio. If several messages were recorded, the first press of the switch will play the oldest message first. Pressing the switch again will play the next message, and so forth until all messages have been reviewed. When the last message is played, a short beep will be generated. If the operator depresses the switch again, the sequence starts over. A replay switch, also a momentary switch, allows the operator to replay the last message played back. If no message was played since the last recording, the oldest present message will be played.

The mobile operator can locally store a message by depressing a locking STORE switch which puts the unit in the store-forward mode. This allows the operator to compose a message which may later be optionally retrieved by the base station. When the switch is in the normal position, the microphone operates the transmitter in a normal manner. In the STORE position, the operator starts to record a message by depressing the PTT on the microphone. When he releases the PTT, his message is played back through the radio audio. Each time the PTT is depressed, the operator can append on to his existing message and each time the PTT is released, the recorder plays back his entire message.

A SEND switch, also a momentary switch, is provided to permit the operator to send a command data packet to the base informing the base that a store forward message has been recorded and may be retrieved by the base operator. The command data packet will only be sent if a store forward message is present in the mobile memory.

The base operator can transmit a command data packet requesting the status of the mobile DVS unit, to obtain time remaining on the recorder and also whether there is a message waiting. If there is a message waiting, a command data packet may be sent to the mobile instructing it to transmit the message. Thus, even if the mobile operator has left the vehicle, the base operator can hear what the mobile operator recorded before he left. An additional feature allows the mobile operator to remotely trigger a special emergency status for his mobile using a portable radio. A portable radio can be used to send a command data packet to the mobile which causes the mobile to transmit a priority status command data packet to the base. The base can then transmit a command data packet to request that the mobile stored message be transmitted.

Figure 3:
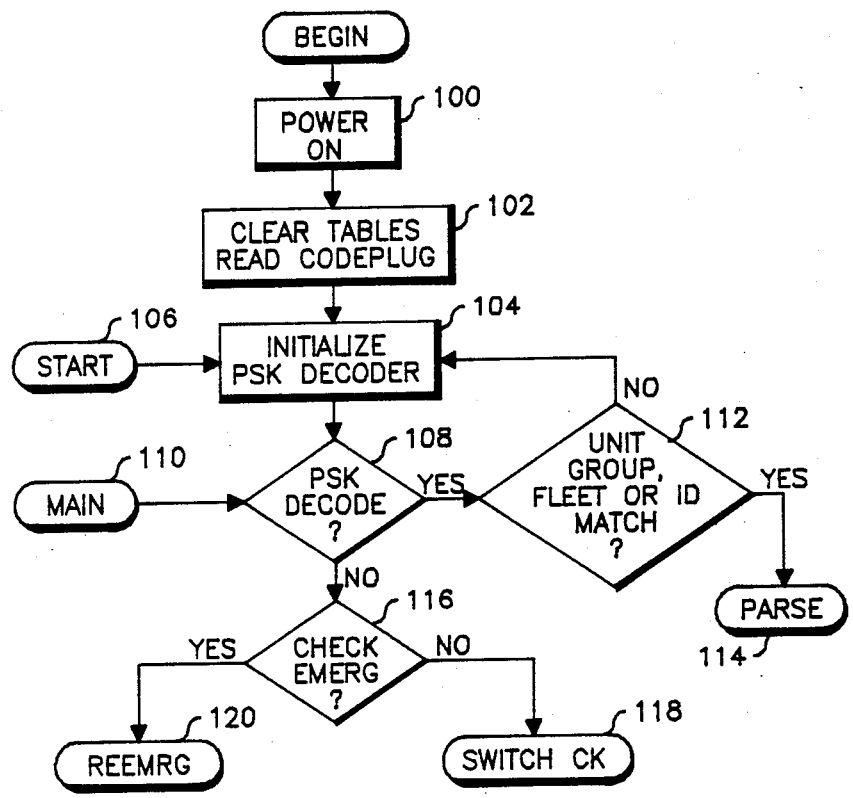
FIG. 3 is a flow diagram of the BEGIN routine of the mobile unit computer program for the invention.

Referring now to FIG. 3, there is shown a flow diagram of the BEGIN routine of the mobile unit computer program for the microcomputer 60 of FIG. 2 for implementing the invention. The program is entered at block 100 upon power on and initialization occurs at block 102 including clearing of tables and reading of system data from the code plug. Program flow then proceeds to block 104 where the PSK decoder is initialized. The PSK initialization block 104 may also be entered from the entry point START shown at 106. Program flow then proceeds to block 108 to the PSK decoder routine. This routine may also be entered from the entry point MAIN as shown at 110. The PSK decoder program is described in detail in the previously referenced co-pending application. If, in the PSK decode routine, a decode of a data packet has occurred, program flow proceeds to block 112 to test for the proper ID match. If the proper ID match occurs, program flow will proceed to the PARSE routine as shown at 114 and if no match occurs then the program flow returns to the PSK initialization at 104. If no decode of a valid command data packet can be made, then program flow will proceed to block 116 to check to determine if it is necessary to perform a re-transmission of the emergency status. If so, the program flow proceeds as shown to the REEMERG routine as indicated at 120 and if not, the program flow will proceed to the SWITCH CK routine as indicated at 118.

Figure 4:
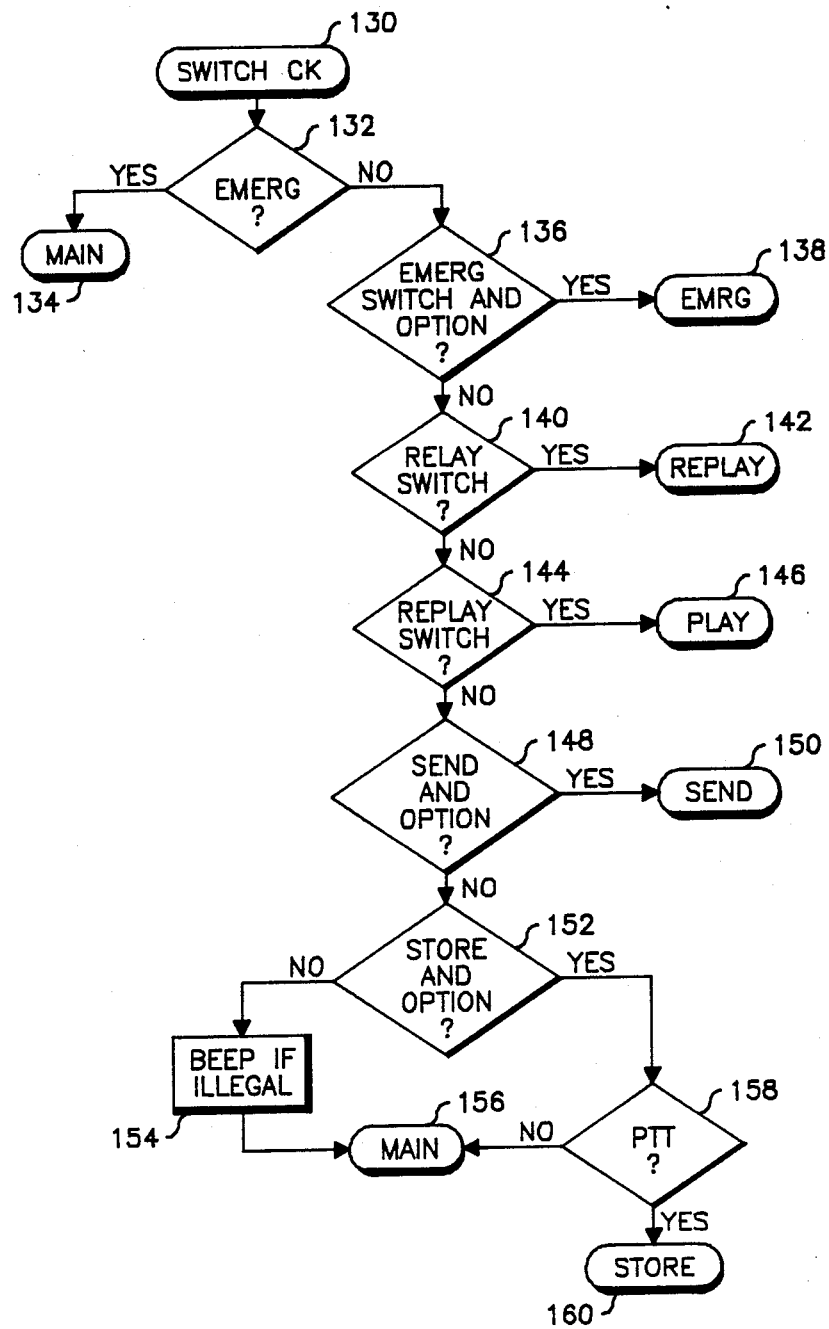
FIG. 4 is a flow diagram of the SWITCH CK routine of the mobile unit computer program for the invention.

A flow diagram of the SWITCH CK routine is shown in FIG. 4, which shows entry to the routine at block 130. At block 132, a check is made to determine if the system is in the emergency mode and if so, program flow proceeds to the MAIN entry point of FIG. 3 as indicated at 134 and if not, another test is made at block 136. As indicated at block 136, the emergency switch is checked to determine if a new emergency mode has just been initiated and if the emergency mode option exists. If the result is true, program control is transferred to the EMRG routine as indicated at 138 and if not, the program flow proceeds to block 140. At block 140, the replay switch is checked to determine if it has been activated and if so, program control will be transferred to the REPLAY routine as indicated at 142. If not, program flow proceeds to block 144 where the play switch is tested to determine if it has been activated. If so, the program control is transferred to the PLAY routine as indicated at 146 and if not, program flow proceeds to block 148. At block 148 the send switch is checked to determine if it has been activated and if the send option is available. If the result is positive the program control is transferred to the routine SEND as indicated at 150. If not, program flow proceeds to block 152 where the STORE switch is checked to determine if it has been pressed and the code plug is checked to determine if the store option is available. If the result is negative, program flow proceeds to block 154 where the beeps are sounded if an illegal operation has been attempted and then program control will be transferred to the MAIN entry point of FIG. 3 as indicated at block 156. However, if the result at block 152 is positive, the program flow proceeds to block 158 where the push to talk switch is checked to see if it has been activated, if not, the program control is transferred to the MAIN entry point of FIG. 3 as indicated at 156. If the PTT switch has been activated, the program control is transferred to the STORE routine, as indicated at block 160.

Figure 5:
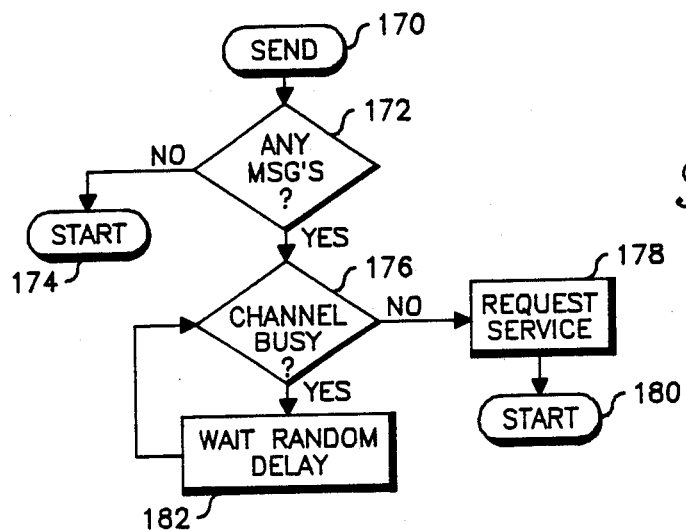
FIG. 5 is a flow diagram of the SEND routine of the mobile unit computer program for the invention.

The SEND routine is illustrated in FIG. 5 and, as shown, is entered at block 170. Program flow proceeds immediately to block 172 to test to determine if there is any store and forward message present. If the result is no, program control is transferred to the START entry point shown in FIG. 3 and if the result is yes, program flow proceeds to block 176. At block 176, a check is made to determine if the channel is busy, if the channel is busy, program flow proceeds to block 182 where a random delay is inserted and then program flow proceeds back to block 178 to re-test to determine if the channel is still busy. If at block 172 the channel is not busy, program flow will proceed to block 178 where a "request for service" data command packet is transmitted to indicate that there is a message available for base retrieval. Program control will then be transferred to the START entry point of FIG. 3 as indicated at block 180.

Figure 6:
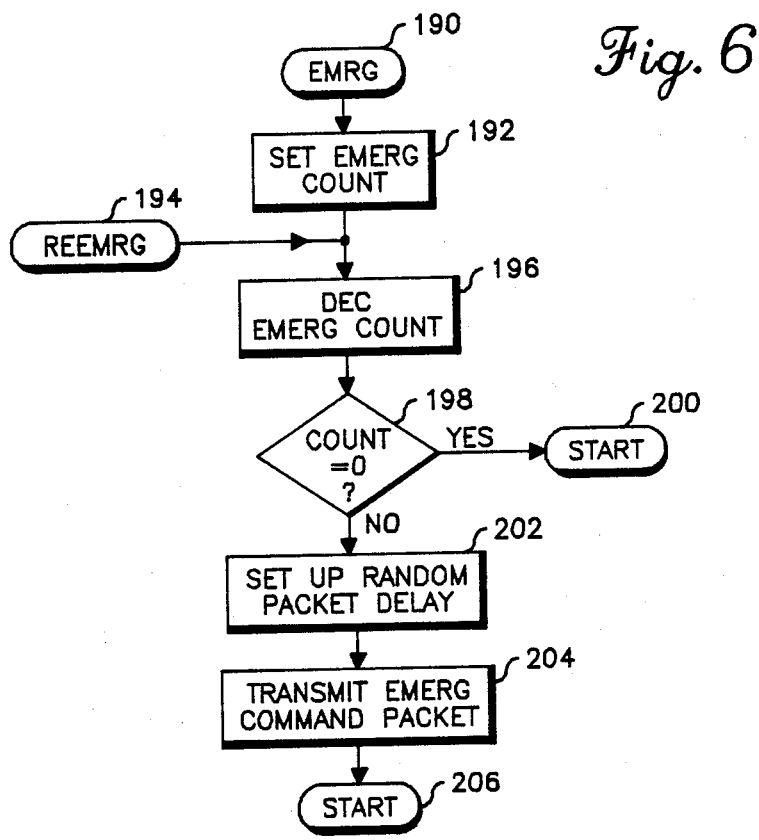
FIG. 6 is a flow diagram of the EMRG routine of the mobile unit computer program for the invention.

The EMRG routine as illustrated in FIG. 6 is entered at block 190 and program flow proceeds immediately to block 12 where the EMERG count is set. Program flow then proceeds to block 196 where the EMERG count is decremented. As indicated at block 194 this location in the program can also be entered from the REEMRG entry point. Program flow then proceeds to block 198 where the EMERG count is tested to determine if it is equal to zero, and if so, program control will be transferred to the START entry point as shown at block 200. If the count is not equal to zero, the program flow will proceed as shown to block 202 where random packet delay is set up for timing the retransmission of subsequent data packets. Program flow then proceeds to block 204 where the emergency command data packet is transmitted followed by transfer of program control to the START entry point of FIG. 3 as indicated at 206.

Figure 7:
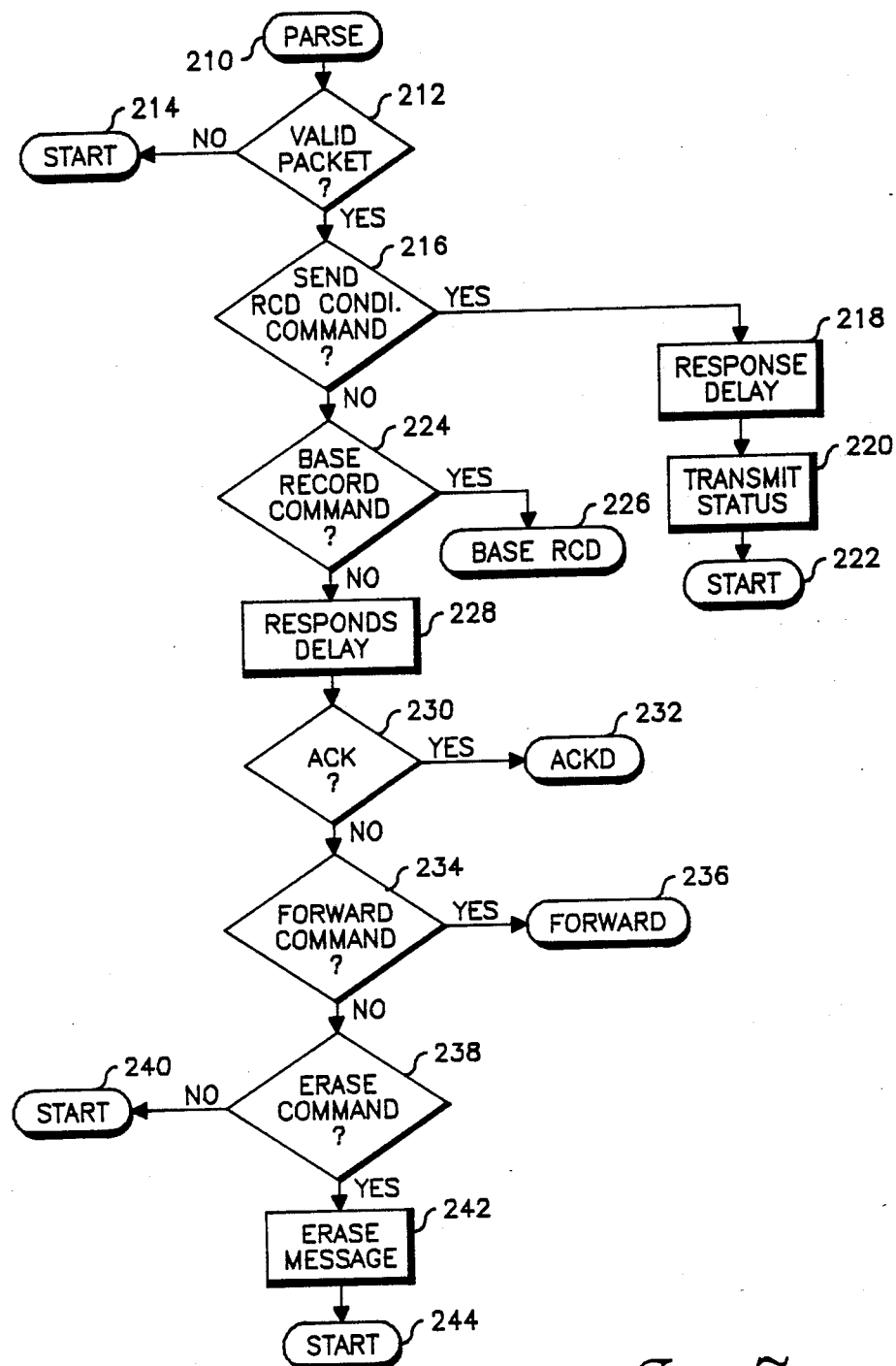
FIG. 7 is a flow diagram of the PARSE routine of the mobile unit computer program for the invention.

A flow diagram of the PARSE routine is illustrated in FIG. 7 which shows the routine entered at block 210 with program flow proceeding immediately to block 212. At block 212, a test is made to determine if a valid data command packet was received and if the result is negative, the program control is transferred to the START entry point of FIG. 3 as indicated at 214. If the packet was a valid packet, then program flow proceeds to block 216 to test the packet to determine if a send recorder condition command was received and if so, the program flow proceeds to block 218. At block 218, a response delay is added and the status of the mobile is transmitted at block 220 followed by transfer of program control to the START entry point as indicated at 222. If at 216, the result was negative, program flow will proceed to block 224 where the data command packet is tested to determine if the base record command was present, and if so, program control is transferred to the BASE RCD routine as indicated at 226. If no base record command was received, then program flow proceeds to block 228 as shown, where a response delay is inserted which allows for the system to settle before a return transmission. Program flow then proceeds to block 230 where the packet is tested to determine if it is an acknowledge and if yes, the program control is transferred to the ACKD routine as indicated at 232 and if not, program flow will proceed to block 234. At block 234, the data command packet is tested to determine if a forward command is present and if so, program control will be transferred to the FORWARD routine as shown at block 236. If the result at block 234 is negative, program flow proceeds to block 238 where the command data packet is tested for an erase command and if not present, program control will be transferred to the START entry point as indicated at 240. If present, program flow will proceed to block 242 where all messages are erased. Program control is then transferred, as shown, to the START entry point of FIG. 3 as indicated at 244.

Figure 8:
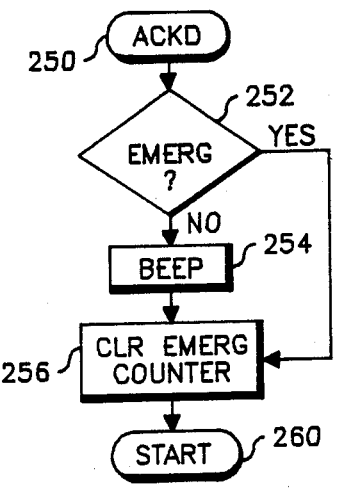
FIG. 8 is a flow diagram of the ACKD routine of the mobile unit computer program for the invention.

The ACKD routine is illustrated in FIG. 8 and, as shown, is entered at block 250 with program flow proceeding immediately to block 252. At block 252, a check is made to determine if an emergency mode exists and, if not, program flow will proceed to block 254 where a beep is sounded to alert the operator that an acknowledge packet was received followed by progression to block 256, as shown. If an emergency is in progress, program flow proceeds directly to block 256 where the emergency counter is cleared. Program control is then transferred back to the START entry point shown in FIG. 3 as indicated at block 260.

Figure 9:
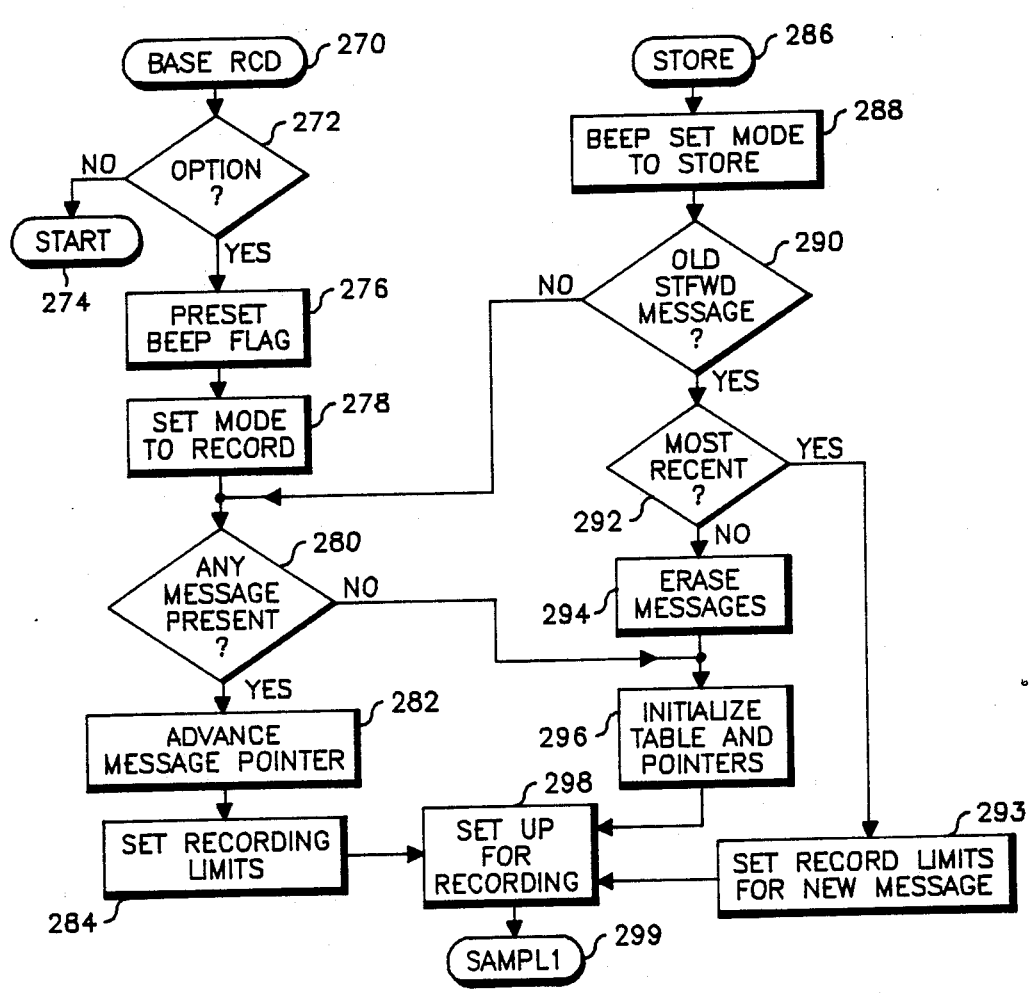
FIG. 9 is a flow diagram of the BASE RCD/STORE routine of the mobile unit computer program for the invention.

A flow diagram of the BASE RCD/STORE routine is shown in FIG. 9, which indicates entry to the BASE RCD entry point at 270. Program flow proceeds from block 270 to block 272 where a check is made to determine if the base record option is available, and if not, program control will be transferred back to the START entry point as indicated at 274. If the option does exist, the program flow proceeds to block 276 where the beep flag is preset to prevent beeping for unreviewed messages. Program flow then proceeds to block 278 where the flag is set to the base record mode and program flow then proceeds to block 280. At 280 a test is made to determine if there are any messages present and if so, program flow proceeds to block 282 where the message table pointer is advanced to the next location followed at block 284 by setting of the start and stop addresses. Program flow then proceeds to block 298 where RAM addresses, tables, ports and constants are initialized to set up for recording. If, at block 280, the result was negative, program flow proceeds to block 296 to initialize the message table at the beginning of the RAM. At block 286 the STORE entry point permits entry to block 288 where a beep is sounded to inform the operator that he is not transmitting and to set a mode flag to the STORE mode. Program flow will then proceed to block 290 where a test is made to determine if there is already an old store and forward message present. If not, program flow proceeds to block 280 as shown, and if the result is positive, program flow proceeds to block 22. At block 22 a check is made to determine if the old message is the most recent and if yes, recording limits are set as indicated at block 293 settig the new start address at the old stop address and the new stop address at the old start address. If the result at block is negative, program flow will proceed to block 24 where all messages are erased followed by initialization of the message table as indicated at 296. From block 296 as well as from block 293, program flow will proceed to block 298 and from 298 program control is transferred to the SAMPL1 routine as indicated at 299.

Figure 10:
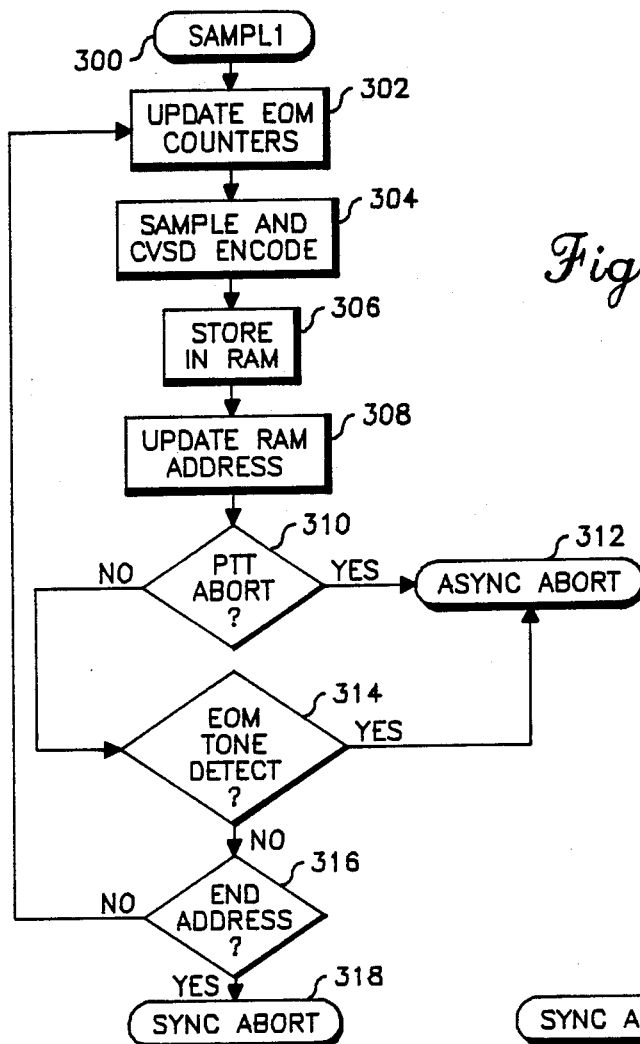
FIG. 10 is a flow diagram of the SAMP1 routine of the mobile unit computer program for the invention.

FIG. 10 illustrates the SAMPL1 routine which, as shown, is entered at block 300 where program flow proceeds directly to block 302 to update the "end of message" counter. From block 302, program flow proceeds to block 304 where a sample is taken and CVSD encoded followed by storage in RAM as indicated at 306. Program flow then proceeds to block 308 where the RAM address is updated followed by a test of the PTT at 310. If the result at block 310 is positive, program control is transferred to the ASYNC ABORT entry point of FIG. 11 as indicated at 312. If the result at 310 is negative, program flow will proceed to block 314 where a test is made for the end of message tone. If the tone is detected, program flow will proceed to block 312 and, if not, an end address test is made as indicated at 316. If the end address is not detected, then program flow will proceed back to block 302 and if the result at 316 is positive, program control is transferred to the SYNC ABORT entry point of FIG. 11 as indicated at 318.

Figure 11:
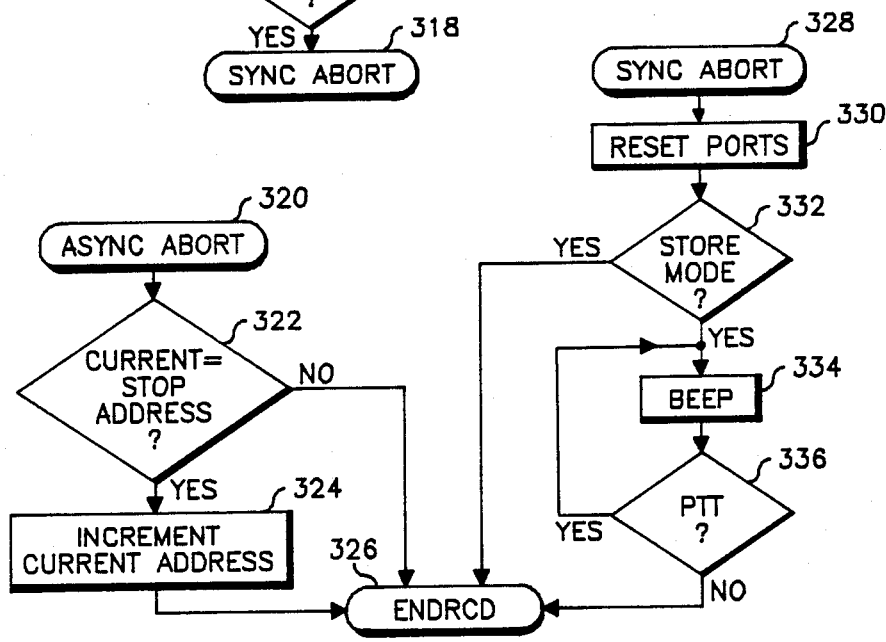
FIG. 11 is a flow diagram of the ASYNC/SYNC routine of the mobile unit computer program for the invention.

The ASYNC/SYNC ABORT routine is illustrated in FIG. 11 and shows entry at the ASYNC ABORT entry point at block 320. From block 320, program flow proceeds to block 322 where a check is made to determine if the current address is the stop address, and if the result is negative, program control will be transferred directly the ENDRCD routine as indicated at 326. If the result of the test at 322 is positive, the current address is incremented to the next full block as indicated at 324, and program control is then transferred to the ENDRCD routine as indicated at 326. The program may also be entered at the SYNC ABORT entry point indicated at 328 where program flow proceeds directly to block 330 to reset the ports to stop recording. Program flow then proceeds to block 332 where a test is made to determine if the system is in the store forward mode and if negative, the program control is transferred to the ENDRCD routine as shown, and if positive, program flow proceeds to block 334. At block 334, a beep is sounded indicating that the memory is full until the PTT button is released as indicated by block 336. When the PTT button is released, program flow proceeds from block 336 to block 326 where the program control is transferred to the ENDRCD routine.

Figure 12:
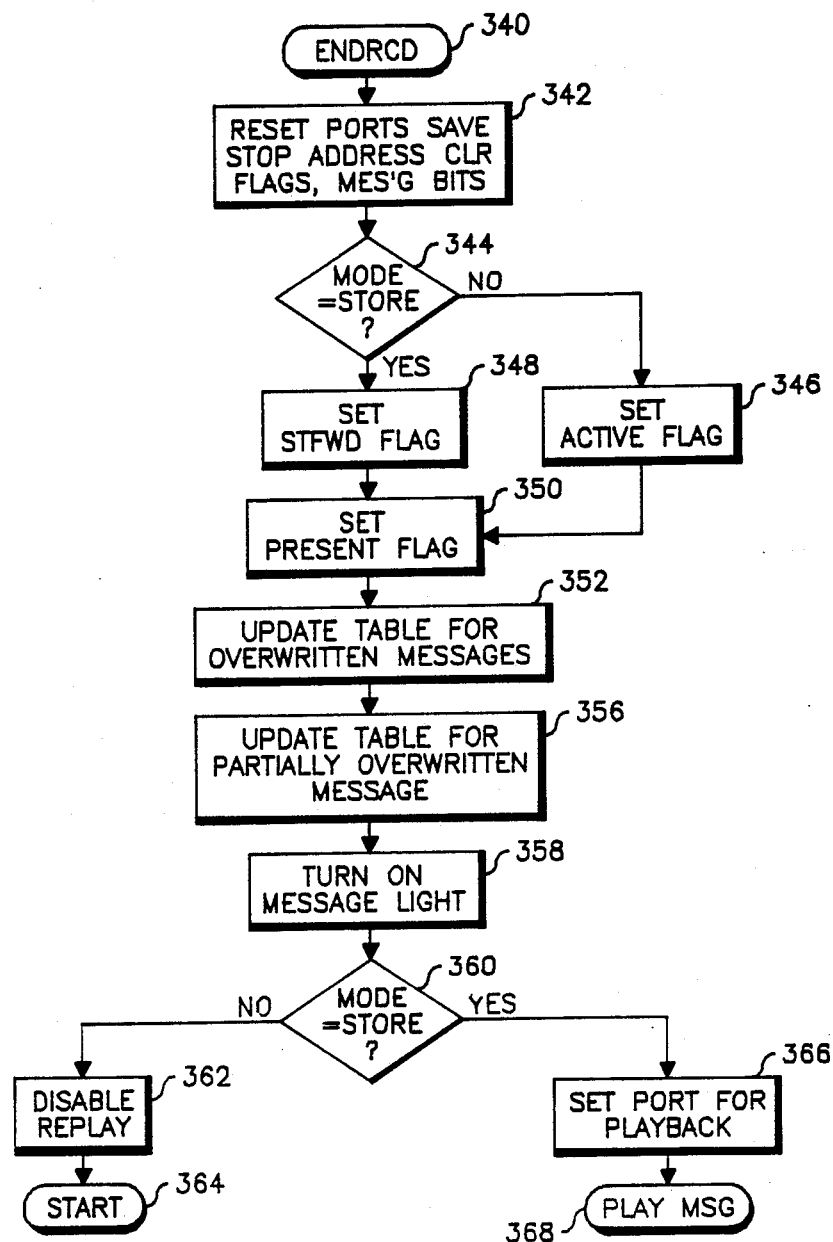
FIG. 12 is a flow diagram of the ENDRCD routine of the mobile unit computer program for the invention.

As shown in FIG. 12, the ENDRCD routine is entered at block 340 and program flow proceeds to block 342 where the ports are reset to stop recording, the stop address is saved in the message table, and the message flags are cleared. Program flow then proceeds to block 344 where a check is made to determine if the system is in the STORE mode. If not, the active message bit is set as indicated at block 346, and if in the STORE mode the store forward message bit is set as indicated at block 348. From blocks 348 and 346 program flow proceeds to block 350 where the PRESNT flag is set. The program then proceeds to block 352 where the message table is updated for overwritten messages, and to block 356 where the message table is updated for any partially overwritten message. Program flow then proceeds to block 358 where the message light is turned on if any active messages are present, and to block 360 to again test to determine if the system is in the STORE mode. If not in the store mode, program flow proceeds to block 362 to disable replay and then program control is transferred to the START entry point of FIG. 3 as indicated at 364. If the system is in the STORE mode, program flow proceeds to block 366 where the ports are set for playback, and then program control is transferred to the PLAY MSG routine as indicated at 368.

Figure 13:
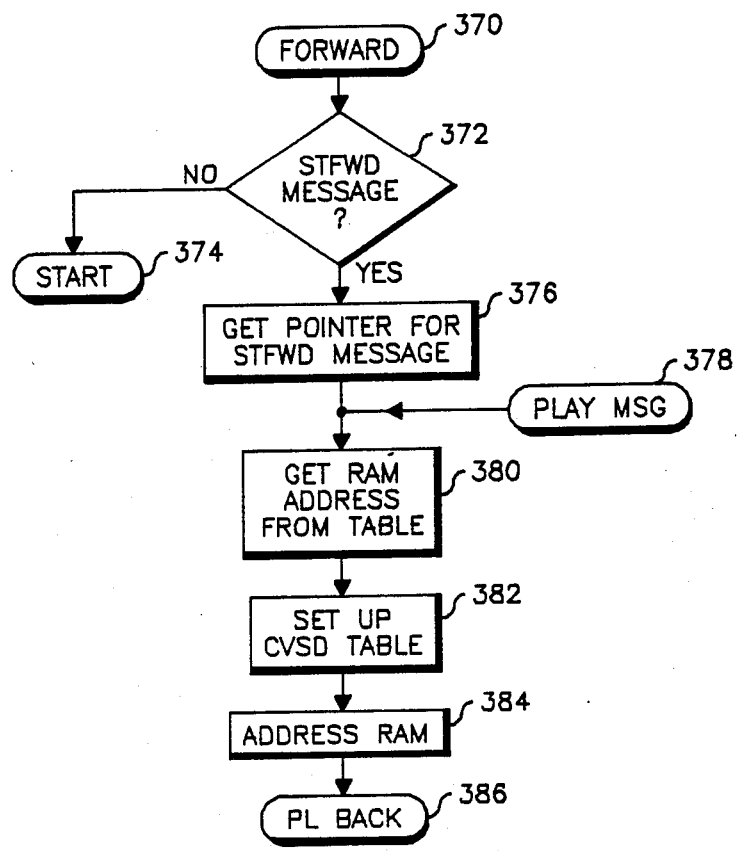
FIG. 13 is a flow diagram of the FORWARD routine of the mobile unit computer program for the invention.

A flow diagram of the FORWARD routine is illustrated in FIG. 13 which shows entry at block 370 with program flow proceeding directly to block 372. At block 372, a check is made to determine if a store forward message is stored in the voice memory and if not, program control is transferred to the START entry point of FIG. 3 as indicated at 374. If a store forward message exists, program flow proceeds to block 376 to get the table pointer for the store forward message and then to block 380 to obtain the RAM address from the table as indicated at 380. Also, as indicated at 378, the PLAY MSG entry point to block 380 is provided. Program flow proceeds from block 380 to 382 where the CVSD look up table is set up in the microprocessor and then to block 384 where the RAM addresses are generated and the RAM is addressed. Program control then transfers to the PLBACK routine as indicated at 386.

Figure 14:
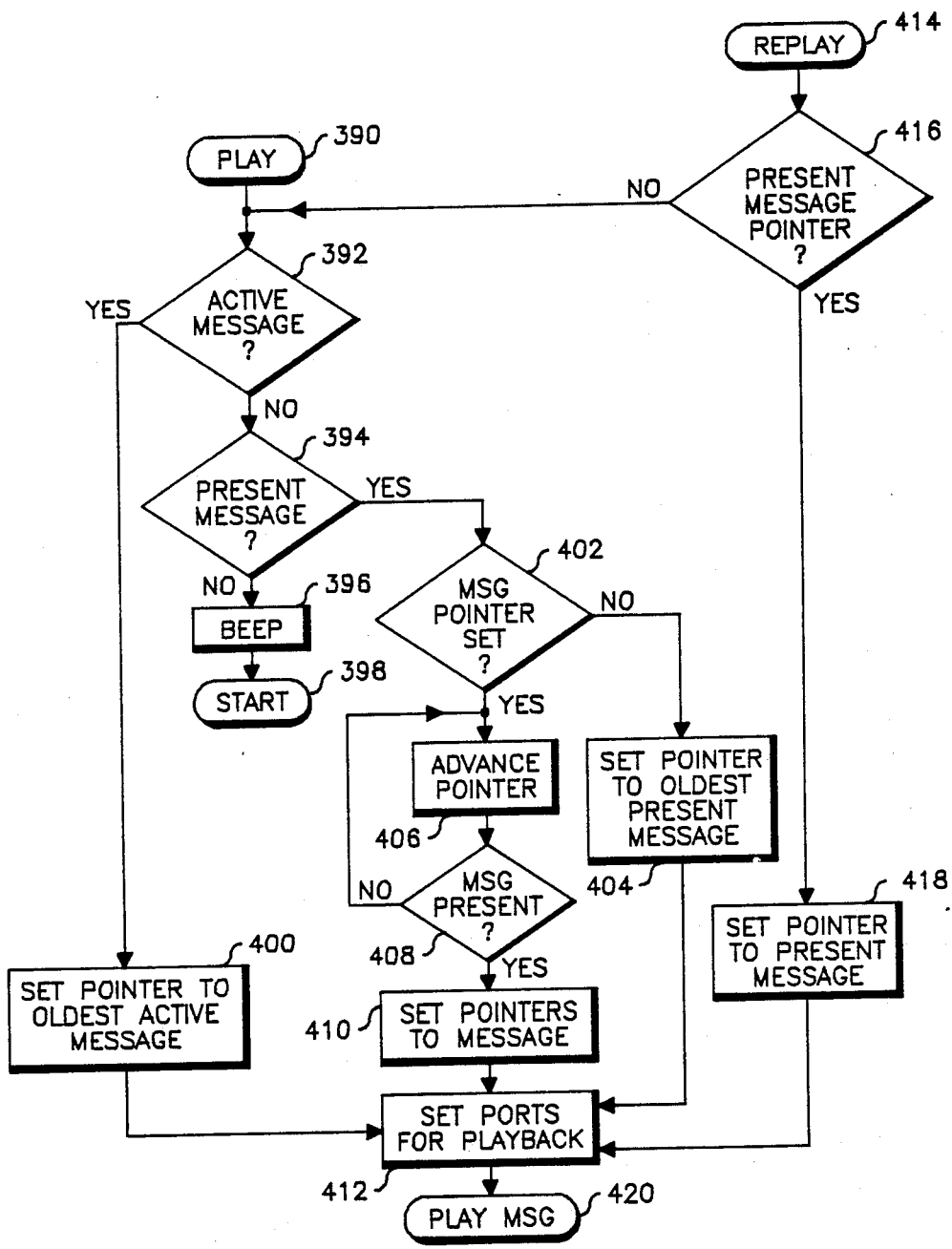
FIG. 14 is a flow diagram of the PLAY/REPLAY routine of the mobile unit computer program for the invention.

A flow diagram of the PLAY/REPLAY routine is illustrated in FIG. 14 with the PLAY entry point indicated at 30. From 390 the program flow proceeds to block 32 where a check is made to determine if there are any active messages present. If the result is positive, program flow proceeds to block 400 where the table pointer is set up for the oldest active message followed by the setting of output ports for playback as indicated at 412. If the result at 392 is negative, program flow proceeds to block 344 where a test is made to determine if there are any present messages in memory and if not, a beep is sounded, as indicated at 396, and program control is transferred to the START entry point as indicated at 398. If the result at block 394 is positive, program flow proceeds to block 402 where a check is made to determine if the message pointer is set. If not, the program proceeds to block 404 where the message pointer is set to the oldest present message and then the ports are set for a playback as indicated at 412. If the message pointer is set, the program proceeds to block 406 where the pointer is advanced and a test is made to see if a message exists at the new location at block 408. If not, the program flow proceeds back to 408 to advance the pointer again, and if the result at 408 is positive, the program flow proceeds to 410 where the pointer is set to that message, and then program flow proceeds to block 412 where the ports are set for playback. If the program is entered at the REPLAY entry point at 414, program flow will proceed to block 416 where the pointer is tested to determine if it is a present message. If not, program flow proceeds to block 392 previously described but otherwise proceeds to block 418 where the table pointer is set to the oldest present message. The program then proceeds to block 412 and from block 412 program control is transferred to the PLAY MSG entry point shown in FIG. 13 as indicated at 420.

Figure 15:
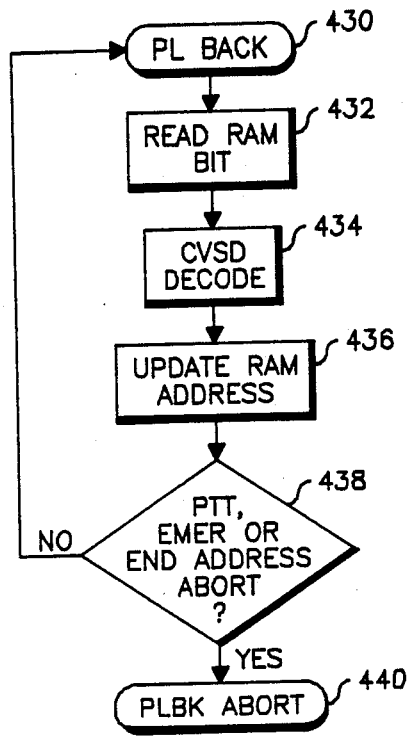
FIG. 15 is a flow diagram of the PLBACK routine o the mobile unit computer program for the invention.

FIG. 15 is a flow diagram of the PLBACK routine of the mobile unit computer program and is entered as shown at block 430. From block 430 the program flow proceeds to block 432 where the RAM is read and then CVSD decoded as indicated at 434. The RAM address is then updated as indicated at 436 and program flow proceeds to block 438 where a test is made to determine whether a PTT, emergency or end address abort signal has occurred. If the result is negative, the program flow proceeds back to block 430 but otherwise program control is transferred to the PLBK ABORT routine as indicated at 440.

Figure 16:
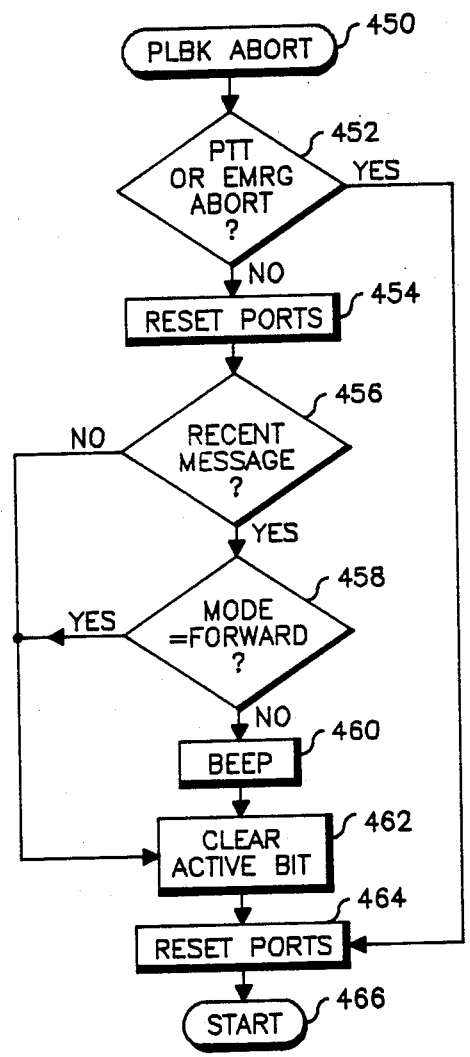
FIG. 16 is a diagram of the PLBK ABORT routine of the mobile unit computer program for the invention.

The PLBK ABORT routine is illustrated in FIG. 16 and shows entry at block 450. From block 450 the program proceeds to block 452 where a test is made to determine whether the abort is a PTT or emergency abort and if so, the program flow proceeds directly to block 464 to reset the ports and then return program control to the START entry point of FIG. 3 as shown at 466. If the result at block 452 is negative, program flow will proceed to block 454 where the microprocessor ports are reset followed by a test at block 456 to check to see if the message just listened to was the most recent. If not, program flow proceeds to block 462 which clears the ACTIVE flag. If the result of the test at 456 is positive, the program flow proceeds to block 458 where a test is made to determine if the message is a forward message from the base and if so, the program flow again proceeds to block 462. However, if the result at block 458 is negative, a beep is sounded as indicated at 460 followed by clearing of the ACTIVE flag as indicated at 462. Program flow then proceeds to block 464 where the microprocessor ports are reset, and then program control is transferred directly to the START routine as indicated at 466.

Figure 17:
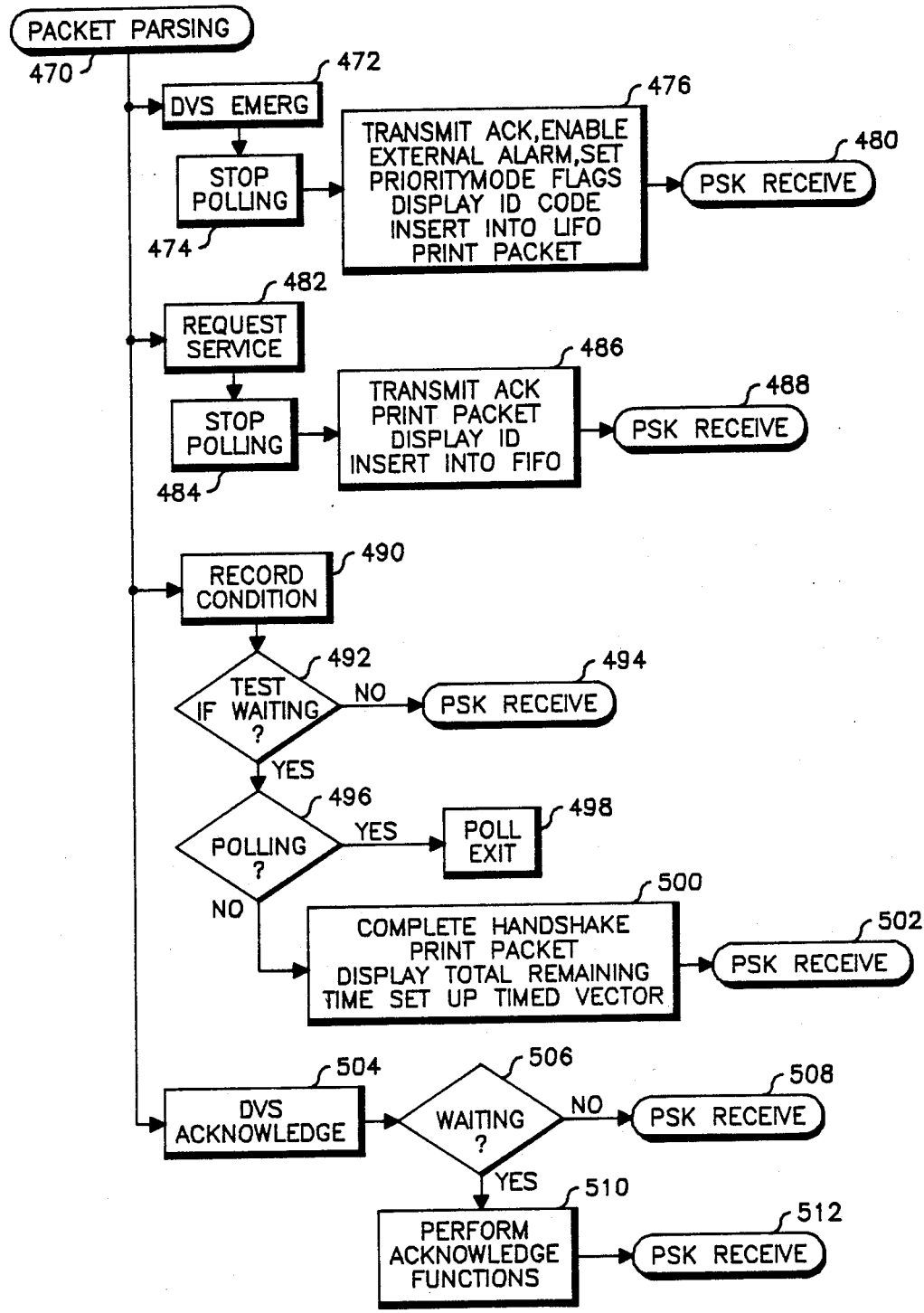
FIG. 17 is a flow diagram of the modifications to the PACKET PARSING routine of the base unit computer program.

As described herein before, the base unit for the digital voice storage system is identical to that described in previously cited co-pending application with the exception of certain modifications to the software described in that application. FIG. 17 is a flow diagram showing additions to the packet parsing routine described in the above referenced application wherein the packet parsing routine is continued following the new operator status function (shown at 358 of FIG. 8B of the above referenced application) such that the new functions shown in FIG. 17 are added to the packet parsing routine. Thus, as shown in FIG. 17, the additions starting after the new status operation of the original packet parsing routine, begin at block 470 proceeding immediately down to block 472 where a command data packet calling for a digital voice storage emergency function transfers the control to block 472 and then to block 474 where polling is stopped if polling is occurring. Program flow then proceeds to block 476 where the DVS emergency functions are performed including the transmit of an acknowledge, enabling of the external alarm, set the priority mode flag, displaying the ID code of the mobile, and inserting into the LIFO stock for later reviewing. Program control is then transferred to the PSK RECEIVE routine as indicated at 480. The PSK RECEIVE routine is also disclosed in the above referenced co-pending application. If the request service function is addressed by the data command packet, program proceeds to block 482 and the block 484 where polling again is stopped if in progress. The program then proceeds to block 486 where the request service functions are performed including the transmit of an acknowledge, printing of the packet, display of ID and insertion into the FIFO queue for later reviewing. Program control will then be transferred to the PSK RECEIVE routine as indicated at 488. A data command packet addressing the record condition function will direct program flow to block 490 and then to block 492 where a test is performed to determine if the base is waiting and if not, program control is transferred, as shown, to the PSK RECEIVE routine as indicated at 494. If the result at block 492 is positive, program flow proceeds to block 496 where a test is performed to determine if poll is in progress and if so, program control is transferred to the POLL EXIT routine as indicated at 498. If the result at block 496 is negative, the program flow proceeds to perform the recorder condition functions including completing the handshake, displaying total and remaining time, and setting up required timed vectors as shown at block 500. The program control is then transferred to the PSK RECEIVE routine as indicated at block 502. Finally, a data command packet calling for a digital voice storage acknowledge function will cause program flow to proceed to block 504 and then to block 506 where a test is performed to see if the unit is waiting and if not, program control is transferred directly to the PSK RECEIVE routine as indicated at 508. If the result at block 506 is positive, the program proceeds to block 510 where the acknowledge functions are performed and then to PSK RECEIVE routine as indicated at 512.

Figure 18:
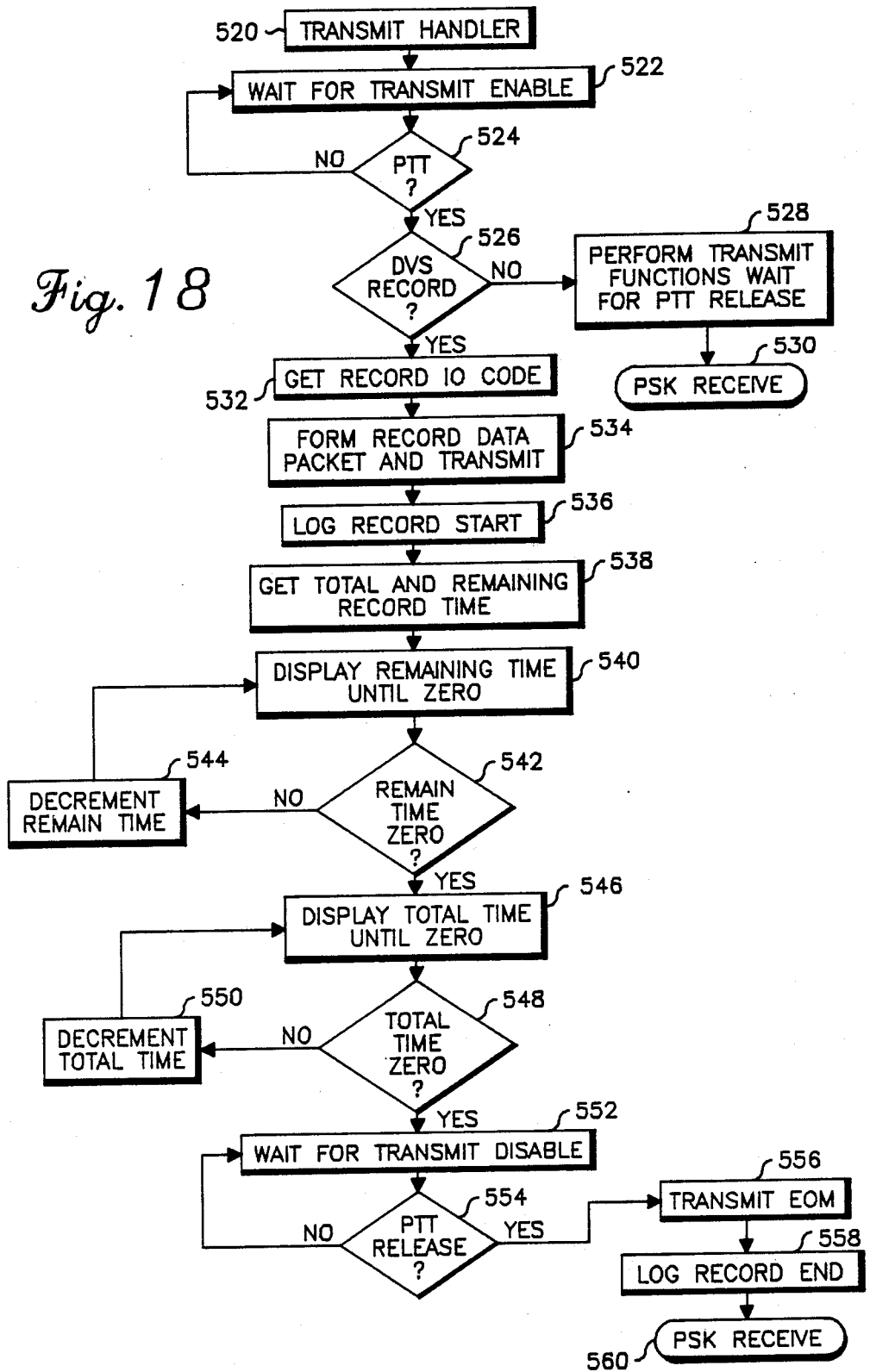
FIG. 18 is a flow diagram of the TRANSMIT HANDLER routine of the base unit computer program.

FIG. 18 is a flow diagram illustrating the transmit handler routine for the base unit computer program for the digital voice storage system. The transmit handler routine, as shown, is entered at block 520 with program flow proceeding directly to block 522 where a wait for the transmit enable occurs. From block 522 program flow proceeds to a test at block 524 to test whether the PTT is activated and if not, program flow proceeds back to block 522 for another wait period. If the result at block 524 is positive, the program proceeds to block 526 where a test is performed to determine whether the base is in the digital voice storage record mode. If not, the program proceeds to block 528 where transmit functions are performed as well as a wait for the release of the PTT. The program control then transfers back to the PSK RECEIVE routine as indicated at 530. If the result of the test at 526 is positive, the program flow proceeds to block 532 to get the record ID code and then to block 534 to form the record data packet and transmit the packet. Program flow then proceeds to block 536 to log the record start time and then to 538 to obtain the total and remaining record time of the mobile unit. Program flow then proceeds to block 540 to display the remaining time and then to block 542 to test to determine whether the remaining time is equal to zero. If the remaining time is not equal to zero, program flow proceeds to block 544 where the time is decremented and then proceeds to block 540 to display the remaining time. If the result of the test at block 542 is positive, the program flow then proceeds to block 546 to display the total time and then to block 548 where a test is performed to determine whether the total time is equal to zero. If the total time is not equal to zero, program flow proceeds to block 550 where total time is decremented and then back to block 546 to display total time. If, however, total time is equal to zero at block 548, program flow proceeds to block 552 to wait for a transmit disable and to block 554 to test for the PTT release. If PTT release has not occurred, program flow proceeds back to block 552 for another delay period. If the result of the test at block 554 is positive, the program proceeds to block 556 to transmit the End of Message (EOM) tone and then to block 558 to log the end of the record. The program control is then transferred back to the PSK RECEIVE at block 560.

In summary, a novel digital voice storage mobile control terminal, particularly well adapted for use in multiple unit radio communications system, and capable of multiple message storage has been described.

While a preferred embodiment of the invention has been described in detail, it should be apparent that many modifications and variations thereto are possible, all of which fall within the true spirit and scope of the invention.

APPENDIX 1

The following is an Intel Hex memory dump of the computer program for the base unit for an MC6803 microcomputer according to the invention.

```
:1080000029432920434F50595249474854203139799
:1080100038322C204D4F544F524F4C412049454343343
:108020002E54494D204255524B450001010201029898
:10803000028301020283028383840102028302839A
:108040008384028383483849485010202030203080
:1080500038402030384038484850203038403846A
:108060008485038493485485859601020203020356
:108070003840203038403848485020303840384444A
:1080800084850384848594858586020303040304304430
:1080900004850304048504858586030404850485851A
:1080A00085860485858685868587080906030008F4
:1080B0005020A0704014F970897B786089700CE74
:1080C00019088641746250580848020038D84AC99
:1080D000F668009602BD8E0D16C10C240FCE80AA44
:1080E0003AE600D7A196A385042706380D7BF7E8832
:1080F000BE8E00FFC10B26230D6A52B12853A261172
:1081000096A48548260BC50B2607BD8C0A3F7E9298
:10811000AABD84E6BD8C1BBD8C343F96A42BEE8596
:10812000826EA96A585B126E496A3852026DE8585
:108130001026DA85082717C10A26D296A5850226B9
:108140007854026067E85277E850A7E929A8502CF
:108150002720DEC396A5850827026E00CE48003A88
:10816000E600863FC1FF275ED7A2CE81D23AEE005D
:108170006E00C10A260F860297A397B67F00CDC670
:108180002CBD8AC33F96B627064F5F97B6DDB4DC99
:10819000B4BD8E08DAA18D21BD8C2BBD8C343FF689
:1081A000480BC4F0D79DF6480DC4F0D19D2609F6C2
:1081B000481158585850D19D39D7B58DE2260484B6
:1081C000F9A9D97B4398E00FFBD84C9CE92097E67
:1081D00091FC91E8828D8308831083188300D82DEFE
:1081E000835891B083F7845DCE8227DFC5C610BD6A
:1081F0008AC386F097A2CE8205DFC3CC0200DDA33E
:108200008608 97A53F96A1810A26037E82D4D6B61A
:1082100027055FD7B6D7A2D6A2BD8E08DAA1BD8347
:10822000DADDC9BD8BBB3FBD82C497BBD6B3C1EFFE
:10823000271DD7BACC507DDDD0D6BBBD83DADDCECD
:10824000CC004 0DDA35FD7CDBD81B9BD8BA73FCEAC
:10825000827EDFC5CC0040DDC9CC3871DDCBBD8B63
:10826000BBCE826CDFC386EF97A220BFD6A1C10A56
:108270002603 7E82D4CAE0BD83DA97C920A596A2E0
:1082800081EF26058 6667E81C697BA20A786FF976E
```

:10829000BB96B381EF271C8AE097BABD819F271751
:1082A000840F16BD83DA97CEC640D7CFCC3871DDA8
:1082B000D0208D86FF97BACC3838DDCECC7700DD64
:1082C000D07E824096A291B2250591B122013986D5
:1082D0004F7E81C67F00A57F00A3DEC56E000D8D99
:1082E0004BCC5F01DDB88611F6481DC520260297EC
:1082F0003BD871FD6A2C00458CE8B4ABD8AC63F95
:10830000D8D29CC5F0520DC0D8D21CC638520D41B
:10831000C8D13CC5F0220CC0D8D1196A484DF97B9
:10832000A4CC5F0420BE96A48A1897A4DCA38A0973
:10833000C4DF240FCA20C540270986067E81C68671
:108340005B20F9DDA3C540260EDCB4DDBA93AF2572
:10835000EEDCAD93BA25E8390DBD832CDCBADDA730
:108360007F00A6CC5F01DDB8C607D7A5CC0920DD11
:10837000A37F00CD7E82E6CE838BDFC3D6A4C4422A
:10838000CA804FDDA3CE0258DF9F3FD6A4C442D798
:10839000A4BD8C64BD8BA73FB648184625058G6DE5
:1083A0007E81C696C126037E940DBD876BD693BD94
:1083B0008E08DA928D24DDC95D2604C63FD7CAD661
:1083C00095C403BD8E08DA948D10DDCBBD8BBB86C2
:1083D0004B76000CE92097E91FCD7A2C40FCE8C68
:1083E0003AA600978E96A2BD8E0D162706CE8C5B
:1083F0003AE600968E39D6E12714D7A28DDBDD50
:10840000C9CC4000DDCBBD8BBBCE841A7E837AC63F
:10841000BD8AC3CE841A7E837A96E2C6043DC329
:1084200078003736388EC00260CEC022608C604BD6E
:108430008AC37E8377EC00D7CD5F4D26054CA7001D
:10844000C620D7A3EC02DDB4BD8C377F00A4DCE1ED
:108450008B01195CC14026024F5FDDE13FDED89CF5
:10846000DA27CABD9193DFD896DD8B991997DD96EF
:10847000DC89991997DC9CDA27B3DCDCBD8E08D740
:108480008E978FBD8B84867797B697CEBD8BA7CE00
:1084900084957E837ADED8BD9193A60297CDEC00B9
:1084A000DDB4BD8C2BBD8C373FCE0190C617D701F4
:1084B000CC0136D30BDD0B9608854027FA8801974F
:1084C00080926ECC615D70139CE5079DFCB5FDD20
:1084D000C9BD8BBB860336CE00C88DD0CE00C89DFB
:1084E000CF324A26F13996BE84FE97BE39DCA7BD4D
:1084F000919FDDA73996A6B14812240A8DEFDDBA07
:10850000270493AD2304BD8C2B3FCC0180DDA386D3
:10851000197A5CE851BDFC37E8385DCBADDB4BDA4
:108520008C34CC0820DDA3BD87258611F6481DC5F7
:10853000202602861597030BD86430F8D602A13C639
:1085400014BD8AC38D6596A48A8097A4CE853ADF30
:10855000C33FBD8BA7BD864CC608D700C614D70342
:10856000BD8663B648178504270SBD861F2003BD59
:10857000862586159701970396A52B18BD95A6DC31
:10858000A3C5202644BD873CDCA38420C440DDA3D2
:108590007F00A53FBD84EBD93794F204596C2C6AF
:1085A000CC5A26FD4A26F8B6580039960A84034C60
:1085B000978DB64819840FC63C3DC300C3DD9FD3D9
:1085C0009F7A008D26F9DD9F39851027057A00C72F
:1085D000201296A544B64813840F2406B64813BD4E
:1085E0008E0D97C7CC1120DDA3CE85F1DFC38D3BE7

:1085F0003FBD873C96C727037E8527CC080497009C
:108600000D7A44F97A396A52B13C618ED8AC3BD95B3
:10861000A696A54424DA7C00A67E84F57E92A18DE0
:10862000128D5B8D1ECE00B82054BD87468D148DF3
:108630000220 4BFC481ADD8A7F008986019788CE8C
:10864000008839CC112483000126FB39C615B648B1
:108650001985402702CA02D70196BE8A4097BEB745
:10866000500039B64819840F2713F6481DC5102746
:1086700034A2709CE50000926FD4A26F739860409
:10868000F6481DC5102702860B979CEC00DD88EC90
:1086900002DD8AED8EAADD8C638BD8A890CBD8A32
:1086A000B35917BD8AA246BD8A957A008526EECCBD
:1086B000C08F74000D708970 0CC0709DD89CC2AC1
:1086C00044DD8B866F978DCE8705DF819608CC01C0
:1086D0009AD309DD0B0E8655979D8D1A7A009C263C
:1086E000F5CE0089A600979D8D0C088C009C26F481
:1086F0000F860897003986 08C6053E5A26FC780082
:108700009D4A26F439D608C901D7085656D89D592F
:10871000494949840497 02CC019AD30BDD0B3B965F
:10872000BE847F200A96A38520261096BE8A80F6F6
:108730005800C508260597BEB7500039D6BEC4BF3D
:10874000D7BEF75000 39860CB740009700CE03041F
:10875000CC018ED30BDD0B9608854027FA96028854
:10876000497020926EA860897003996CDBD8E0D3A
:1087700084089783CC0400D785CE00909ABEB7506A
:1087800000CC14315A26FD9ABEB75000D685BD8E56
:1087900008DA83F760003DD6024FBD8E0DE7000872
:1087A0007C00858C009D26E4D6BECA04F75000C428
:1087B000FBF75000399602 73008B271C16988AD756
:1087C0008AD8085476008344CC00B02403CC00BA85
:1087D000D30BDD0B7A008C3B7A008CD608C801D70E
:1087E00008369602 16988AD78A44CC00E72403CC30
:1087F0000DDD30BDD0B3298024476008D3B0F8EEB
:10880000 0FFCC0815DD00D703B74000B668004F65
:108810005FCE0083E70008 8C00E326F897089702F4
:10882000867E9780D7C053D7DFCE7A80F64818C5AA
:10883000102603CE7900DFD4DFD6DFD2F64819BD8B
:108840008E0DC403CA04D710860297 1197E3FC4823
:108850000BDDADFC480DDDAFFC480FDDB1B64811B6
:1088600097B3B6481F4C97C2BD9481BD876BC67441
:108870009A600262B8C009226F6C670CE7800A79B
:108880000 0A600261B088C800026F4CE7900DFD8D5
:10889000DFDABD8C0AB6481D840F8102270CC66C36
:1088A000BD8AC38605BD84D620F9BD84A9C664BD32
:1088B0008AC3B65800492A037E9992BD981E8E003D
:1088C000FFCE00836F00088C009E26F8CC05089729
:1088D0008CD7088614979E96C297BC96A3843F9720
:1088E000A3CC00 8DDD86CE87B5DF81DC09C3001403
:1088F000DD0B0E968C26FC8605978C968316988445
:108900000D784D6887 3008927037E89A34424095C11
:10891000C102260 45F7C008CD788D68DC41FCE8010
:108920002A3AE600C407969C4CC10224024A4A4DEA
:108930002A014F811E2F02861E979CD6BE919E2C27
:108940000486142004CA80860A979EF74000B65811

:10895000004992A0796DE26187E87FEBD8DB9F740AE
:108960001960285022709B6481D2B040F7E8C73E1
:10897000DC9F830001DD9F96A3240E7D00A42B04C1
:1089800085102705DEC30F6E0085212713588520 2B
:108990002705CC08172407CC001525028608DD0022
:1089A0007E88F34424095AC1FE26045F7A008CD7DE
:1089B00088D684968B2B0156CE802AC41F3AA600F7
:1089C000D6A3C5402720C61ED79CDE86D685C1709B
:1089D00026022077C507260308DF865CD78598A383
:1089E0004869007E88F3CE008E4BD8AB8CE802AC2
:1089F0004FD68EC807543AA900CE802AD68FC80910
:108A0000543AA900CE802AD690C82A543AA900CE5A
:108A1000802AD691C844543AA900CE802AD692C85A
:108A20006F543AA900847FD6A3C43F8105230681F1
:108A3000232504CA80CA40D7A3D6B7270B86175A66
:108A4000260286159701D7B77E88F30F86368D39B3
:108A50008D508D4159E80056D68459D784C453CEE1
:108A6000802A3AA600840781022F08DC838840C848
:108A700013DD83968349498D3A7A008526D2BD8ECF
:108A8000AA938C26037E8ED73F9785CC008DDD86FA
:108A90004F5FDD8339D68359D783C465CE802A3AA8
:108AA000E600DE86088C009C2603CE008EDF86560C
:108AB000690039CE0088690569046903690 26901A2
:108AC000690039CE8AD23AEC00DDC9EC02DDCB7EFA
:108AD0008BBB501C390079373F37545C00007171F3
:108AE0003F000000507D5E065C74383077 7106549C
:108AF00058777F7F7F310737395E54790054582C
:108B0000071005B545871733E507D5C38507D733EEC
:108B1000373E5C38373E795E796D735E39004F546D
:108B200058715038390 05E30373E5E30507D5E30CF
:108B300038717D5C50735C63635C5C7D00007C001D
:108B4000507977005079390050 79763950003 97969
:108B500050003107797D7750 79003950 6D003950D8
:108B60007300 76396D00DC8E8D34D7CB168D2FD700
:108B7000C9DC8EBD8E0D8D26D7CC168D21D7CACEE1
:108B8000 00CC2026DC8E8D16D7D0168D11D7CEDCEA
:108B90008EBD8E0D8D0D7D1168D03D7CF39CE8CD3
:108BA0000C40F3AE60039CE00D15F8D4497CC8DDA
:108BB0004097CB8D3C97CAA6 0097C9BD8C64864070
:108BC00097C8CE00C8C607D785A6005F4659F7608C
:108BD00000CA02F76000C401F76007A008526EB46
:108BE00088C00CE26DF96CDBD8E0D8408B76000C0
:108BF00039A60009813F27025C395D2701394F39C9
:108C00003F065B4F666D7C077F6F8D0FDDE1BD8199
:108C1000B9DED89CDA271D387E847A96BE84829786
:108C2000BEB75000BD8725861597034F5FDDA3971C
:108C3000A597DE397F00CDDCB4D78EBD819F26029B
:108C4000840F978FDE8E2706BD8B847E8BA7B64858
:108C5000184724F496C126F0CC4040DDD0863FDD95
:108C6000CE7E8BA796CD847FDED89CDA27028A90C1
:108C700097CD3996C297BCBD87257F40008608975F
:108C800000DCA384FD97A3C5082626853C2613DCBB
:108C9000A4C5082707BD8C1B8D9A20065625034DB9
:108CA0002A0FBD8659BD97F4BD8643BD8DA77E8D25

:108CB00064B658002A2AC614BD8AC3BD864386629C
:108CC000D602C5022606BD8BA77E8D64F658002B02
:108CD00007BD859D2BE820084A26E5BD8DB720DE1F
:108CE000BD8659BD8BA7D6A4C508261B7F00CDBD68
:108CF0008BA7B648192A1096C0270C0CBD8326CC2A
:108D00005F02DDB87F00A2F64817BD8E0D96A484E1
:108D10008462608BD8643BD97F4202C36BD864CF8
:108D200086149703BD866332B1842605BD861F2085
:108D3000E4D2A08BD862FBD97F42006BD8625BDA1
:108D400095A6C615D701D703B64817BD8E0896A4B9
:108D50008410463685082705BD8E12200BD8DA7D9
:108D6000324D2608BD8643BD97F42022C614D70392
:108D70008188261EBD862ACC15009703D7A3D6A4CA
:108D8000C440D7A48602972BD95A6BD8BA7BD8778
:108D90003C3F81082605BD874620DCBD862FC615D1
:108DA000D703BD97F420E48696D602C50226013982
:108DB0004A26F68D0220F0D6BEDED49CD6260D7A49
:108DC0000BD2602C4FD96C297BC2032C5022614FF
:108DD000B65800850426EF7A00BC2622CA02861403
:108DE0097BD201A96038508271496118520270E13
:108DF0009CD22603CE80009DFD4A6009713F7503B
:108E0000096BE0556D7BE3905050503904040408C
:108E10000439D6A4C540262FC502272B96A99784CE
:108E20007F00A97D00AA2F0C8D287A0084270C7A58
:108E30000AA2EEF5F9684DDA92EEDC628BD8AC359
:108E4000D602C50226FA394F5FDDA98D057C00AA3E
:108E500020F98D19CE0179C6FA9602850227075AA4
:108E600026F70926F2398614970331313996A981FC
:108E70064260340F97A997868D11978F96AA978698
:108E80008D09BD8B668604B7600039C6087F008EE9
:108E900096864824014C9786860099BE19978E5A9B
:108EA0002707998E19978E20E739CE00884F5F37B4
:108EB000A80097874444444498879787164F050530
:108EC0000505D78605988697868D8732998608BCB8
:108ED0008C26DB435339B65800492A0896DE2712
:108EE004DEC56E00860897009688813F26579657
:108EF08A9786840F979D96BA84F09A9D978ABD2B
:108F00090C52650BD910CBD904D96A52A0ADCABAC
:108F100BD919FDDAB7E92A1462415BD9714BD90F7
:108F2000F17C00A6BD90E125037E84F57F00A53F7E
:108F3000BD9714BD90F1CE838BDFC3C6824FDDA3F6
:108F4000CE0708DF9F3FDC8AB3480D2507FC480B9E
:108F50000938A24013F96882640B648148504260BA
:108F60003FBD9714B6481784402709BD906224047A
:108F7000BD906D3F96A385202706DE8A9CB4270608
:108F800096BE8A0197BEBD9127CC201097A39688E4
:108F90002702C601BD903520D78103261896892661
:108FA0013BD90C5260EBD904ABD9714C61CBD8A40
:108FB000C37E83773F81012630B648148501272878
:108FC000BD9714BD905A2508BD9127C610BD902F9E
:108FD000B64816854027118B648142B05BD90D12000
:108FE000796892BF7BD90D93FDE888C1F0327B1E8
:108FF0008C1F01260BB648148508270378F613F1E
:109000008C1F0226FAB64814850227F3BD9714BDBB

```
:10901000905A2517B648188510270C96DF2708BDEB
:109020009162BD8BBB2004C6018D04BD906D3F963F
:10903000A385202637D7CD8D11DE8A9CB4270486E0
:109040007897B7DC8ADDB47EBC377F00A596A38441
:10905000205FDDA37300B67E873C0CB648178502FF
:10906000270ADC8A93AF2504DCAD938A39B648160B
:109070004724514725048DEA254A96A48A0197A4DE
:10908000BD95A6CE03E8BD84ACCC5F037D008826E9
:1090900003CC2000DD88B648168504260AB65800A1
:1090A0002BFBBD859D2BF696BE8A40B75000C6149B
:1090B000D703BD8663CE0088BD867E86159703964E
:1090C000BEB7500039DE8A9CBA260596A3438510A8
:1090D00039BD906225FA7E871FBD906225F27E879A
:1090E000250CB648188508270796B9850227010DA3
:1090F000395F968985012702CA0885022702CA01BD
:10910000D7CDBD8E6DD6A4CA02D7A43996869470F9
:109110008B10C6A63D4497A9968984FCC6A63DC37C
:109120000298444497AA39B648188502733DE8A26
:10913000 C780226079688178002725CE, 209EE
:10914000A600A7048C780026F6DC8AFD78029688B3
:10915000C610811F2603CC0001FD7800CC0101DD83
:10916000E139DCDA93D827163736388C017D2705AC
:109170008CFFFD260139DEDAEC00938A27F7DEDA70
:109180008D11DFDADC8AED008601A702DCDC8D0FB1
:10919000DDDC390808088C7A802603CE790039DDB9
:1091A0008E968F8B0119978F968E890019D68F39DD
:1091B000C630BD8AC3CC0200DDA3860897A5CE9138
:1091C000C4DFC33FD6A17F00A5CE91D4583AEE00AC
:1091D000863F6E00839892FD91EA935C92B9923536
:1091E00092E39221923E924681C6BD819F260586DA
:1091F0006D7E81C6C65CBD8AC3CE9210DFC3CC0033
:1092000080DDA3CE04B0DF9F3FBD8C2BBD8C343FEF
:10921000CE921BDFC5CC77407E825796A297B320B3
:10922000E8B648192AC97300C0270FC608BD8AC30B
:10923000CE920920C77300DF26F1C60C20EFBD983F
:1092400011BD94C820C396BF26104F4397CDC620AA
:10925000BD8AC3860CB7600020D6C654BD9A8CCE9A
:1092600092642010DEA7DFB40DBD832CC624BD9A06
:109270008CCE927BDFC54F5F7E930FDEA726037EE9
:109280009209DFB44F5FDDA7DDABCC5F01DDB886AF
:1092900001097A2864097A57E836CBD9834868097F0
:1092A000A5DEA79CB427037E8522BD9834C628BDC1
:1092B0009A8CDCABDDB47E8111C634BD8AC3CE92FC
:1092C000C47E91FCD6B1CE92DBDFC5BD83DADDC9A9
:1092D000CC507DDDCBBD8BBB7E81F6BD939E97B11F
:1092E0007E9209C63BBD8AC3CE92EE7E91FCD6B27C
:1092F000CE92F520D4BD939E97B27E9209C63CBD16
:109300008AC3CE93087E91FCCE9353DFC5DCADDDDE
:10931000A78D66CC0200DDA3860897A5CE9322DF39
:10932000C33F96A1810A26067300B67E82D48D01C2
:109330003F96B627064F5F97B6DDA7DCA7BD8E0820
:10934000DAA1D7A8BD819F2604840F9A9D97A7D63E
:10935000A820268D35DEA7DFAD7E9209C640BD8AE6
:10936000C3CE93677E91FCCE9370DFC5DCAF209FA8
```

```
:109370008D18DEA7DFAF7E9209D78EBD819F2602B2
:109380000840F978FBD8B847E8BA7DCA7B3480D25F8
:109390008FC480B93A725013986587E81C696A2FF
:1093A000B148102506B1480F220139864F7E81C68B
:1093B00054042733507666581077755E545C27335D
:1093C000502640DCC400097CBD7A2D7A1D786D605
:1093D000A2C40FD787BD8E08DAA1BD83DADDC9BD6F
:1093E0008BBB0E3E0FD6A1C10B2705C10A26DE3965
:1093F0008E00FF7E920936CE93B0BD8AC6CE17701E
:10940000BD84B03297CC8DBCDE8696A23986049797
:10941000A3CC06008DE0816024F7DF92CC5B048D45
:10942000D5812424F7DF9481122506D695CA04D766
:10943000095F64818C5402608D695CA08D79520143I
:109440004D2605CCO201200A81132508DC948002FB
:10945000C001DD94CC4F098D9D813224F74D27F457
:10946000DF97CC660C8D8F811324F74D27F4DF999D
:10947000CC6D108D81DF9B7F00968D05D7C17E83DB
:10948000AA7F0085CE0090CC04F89ABEB75000D7D2
:1094900000C6315A26FDD685A600BD8E08F76000AD
:1094A000970286249ABEB75000084DFB75000087C2C
:1094B00000858C009D26DFC608D70096BEB75000F9
:1094C00039BD98118540273C7F00E0C60C8D1F8D6B
:1094D0003396E32707CE800086218D4F4F97E38D8B
:1094E00023CE986D86348D43201AC40FCA303CDEDB
:1094F000D69CD22603CE800009DFD6E70038398D0E
:10950000ED1620EA8D007C00E0C60D8DE1C60A8DC7
:10951000DDB648182A09CC0E0F8DE486072021CC31
:1095200005008DCA4A26FB860E2015E6008DBF0871
:109530004A26F83996C12706B6481846250A8618DD
:10954000C6208DAA4A26FB39BD876BBD968ADC945E
:10955000C4F38DABC63A8D96DC928DA3C63A8D8E40
:10956000DC908D9BC6209695850826DC6708504DC
:109570002602C661BD94EE8D29DC978D82C62DBD75
:109580094EEDC9983303D5D27028B0A4AC6033D96
:10959000CE98EB3A86038D93C62DBD94EEDC9BBD31
:1095A00094FF8603209ABD9811B64814D6A4C5012D
:1095B000271B8520260139BD9623DC8ABD9628BD50
:1095C0009534CE98E2BD96A6BD97B3203785402747
:1095D00011DCA4562405850426083996A385102796
:1095E000139B64158508260139BD37DCBA8D3822
:1095F00BD9534BD969C96A485042722CE98A18658D
:10960000058D952BBD9506D6E0C13C260AB648158A
:1096100085402703BD94C896A484FA97A439DCBA80
:109620007E97DEFC481A201281FF273CC1FF2744A9
:10963000979084F081E0272096908D0FBD819F2622
:10964000486209790BD98657E95A29791D793BD8B
:109650008E0D9790D7922032D793BD8E0DD7928DD5
:1096600029CC4752DD9020DDCC2041DD90CC4C4C04
:10967000DD9220D1BD819F27EFCE464CDF90C654AE
:10968000D792840F8A30979320BBCE0090A6008497
:109690000F8A30A700088C009D26F239D6A28603D7
:1096A0003D04CE98A63A8603BD952B7E95A2CE00AA
:1096B00090CC200808A7005A26FA9688813F2719DF
:1096C000811F26089689810226028D08CE00918688
```

:1096D000087E952BC642D79239C6209689850127E8
:1096E00002C64DBD94EEC620C5022702C642BD94F7
:1096F000EEC620BD94EE96A98D07C63ABD94EE96AF
:10970000AA9786BD8E8B16D78EBD8E0DBD94EAD6D8
:109710008E7E94EABD9811B648152B06BD90622442
:109720001399688F648154D2607C50427F37E971C
:10973000988101260605C50127E82035813F27169626
:10974000898101260605C52027D8204D81022606C51D
:109750000227CE2020C50827C89688813F2716F605
:109760004814C52027BB8D408D49BD969C7E96042C
:10977000B648142B0A8D318D3ABD96AE7E960496 6E
:10978000892A0E8D23CE98E5BD96A6BD96AE7E960F
:1097900048D15CE98E820F08D0E8D17BD96AECCB9
:1097A0002A2ABD94FF7E9604DC8ABD9628BD9623A6
:1097B0007E95345F9638271C5C810127175C8103A6
:1097C00027125C813F270D96895C810127065C8109
:1097D000227015CCE98C18603D3A7E96A6C1FF62
:1097E000270FBD819F270A16C4F0C1E02603BD964E
:1097F000797E96048D1B8510260139BD96238D0C2C
:10980000BD9534CE98C4BD96A67E960486077E95F7
:1098100040F64818C502260238 39B6481539BD94B5
:10982000C1BD9638DE6BD953ECE98D6860CBD95DE
:109830002B7E96048DDBBD9623DCBABD9628BD95A4
:1098400034861097A2BD969CDEA72606CE990F7E81
:1098500095FFDCAB8D0CC62FBD94EEDCA78D037E8F
:109860009604BD964BCE0090860 47E952B4F5249B0
:1098700047202020444553542020202054494D87
:109880004520202020202020444154452020 2015
:109890002020204643 4E2020202053544154 55532D
:1098A000204641494C20524353524345524348526B
:1098B0004353474554544525253524350524353E5
:1098C00048 5052495 4582041434B524320454D5231
:1098D0005215341434B2020202020204C4F472001
:1098E0004F4E41434B54585358454A414E4645B8
:1098F000424D41524150524D41594A554E4A554CA4
:1099000041554753455504F4354444E4F56444543 39A
:10991000544152548E00FF7F40004F5FDDC9DDCBC4
:1099200097CDBD8BC0C644BD8AC38614BD84D6C640
:1099300014D703CE8705DF81CC080C9708D700CC5D
:1099400019AD309DD0B0E8655979DBD86F620F74B
:109950001F04030 01F010 8083F0 4030 03F040 7041D
:109960003F010808CE99503AEC00DDB8EC02DDBAB0
:10997000C614D703D7DECE00B8BD867EC615D70382
:10998000CE9CDDDFC3CE0080DFA3CE0BB8DF9F7E91
:109990008643B648188504260E866DBD84C9B65820
:1099A0000492BFA7E87FE7F00088605BD84D6C657
:1099B00048BD8AC3BD8C2BB74001CC04FF97A3D709
:1099C000A10EB65800492B037E87FED6A1C1FF2702
:1099D000F10FC10B27D996A52704DEC36E0096A40C
:1099E000273BC101262C9602850226037E9ABC5F86
:1099F000BD9964CE99F9DFC53FDE88DFDFDE8ADFFF
:109A0000E1C604BD9964CE9A0B20EB968897E37E5D
:109A10009AF5C10326037E9B54863F200EC10A2679
:109A2000997300A4C64CBD8AC3208F8E00FFBD84ED

```
:109A3000C9BD9A8F7E99AFCE008E5F8640B7500029
:109A4000F7600086034A26FDB6580043A700BD9D77
:109A50004686394A26FD08CB108C009E26DDCE00B6
:109A60008ED693E8002B0A088C009E26F4867C2074
:109A7000BACE008E5F96932A02C630D784A60084A1
:109A80003098842606088C009E26F239BD8AC3CE03
:109A900017707E84B0DCDFB3480D2508FC480B93BB
:109AA000DF250139865B208396E1270AB14810251E
:109AB0006B1480F220139864F7E9A2B86159703EF
:109AC000BD9A37261186119703BD9A372608C650CE
:109AD000BD8AC37E9A31CE009DC602A60048484882
:109AE0007900E27900E17900E07900DF5A26F00997
:109AF0008C008D26E4C6548D938D9ADCDFBD93795E
:109B00008D8DC658BD9A8C8D9FD6E18D38BD819FB5
:109B1000261096E2840F8AE0B1481271486077E4A
:109B20009A2BC65CBD9A8CD6E2C40FC10A24EE8D76
:109B30001496E2BD8E0DB84819840F2705867F7EE6
:109B40009A2B7E99AFBD83DADDC94F5FDDCBBD8B2C
:109B5000BB7E9A8FC654BD9A8C4F5FDDA7BD9379AB
:109B6000CE9B6CDFC386FF97A57E99BAC10A2705F5
:109B7000BD93B20F4DCA7DDDFBD9A95C610BD8AFE
:109B8000C3CE9B897F00A220DAC10A2711D6A2BDCD
:109B90008E08DAA1BD83DADDC9BD8BBB20CB96A2CE
:109BA00097E1BD9AABBD819F2609F64811C40FD739
:109BB000E22035C65CBD8AC3860F97A2F64811C461
:109BC000FBD83DA97C9C640D7CACC3871DDCBBD8B
:109BD0008BBBCE9BD87E9B63C10A27035F20B3D685
:109BE00A2C11025C87E9B1DF64819BD8E08DAE279
:109BF00D7E2C668BD8AC3CE9BFD7E9B63C10A27A0
:109C0000037E99BAC660BD9A8C960285022 73DC62E
:109C10008BD9964CE00DFBD9968C60CBD9964CEBD
:109C200480BBD9968C610BD9964CE00E3BD996824
:109C30005FBD9964CE9C3ADFC53FDC8893DF260682
:109C4000DC8A93E127037E9CDD7E9AF586159703D7
:109C50008D26B61197038D20860297C2C61596938E
:109C60002A02C614D703378D1A33C4FBD7038D13CA
:109C70007A00C226E77E9ABCBD9A372601 39867CD7
:109C80007E9A2B7F0084CE00E286049786E60056FB
:109C900086108D175686208D1296844C81102601D1
:109CA0003997847A008626E70920DE373C978386 39
:109CB0003978596932B3224298D7786489A83B70C
:109CC0005000C6115A26FD8648B750008D72CE004E
:109CD000E80926FD8D78270E7A008526DC866F7EC2
:109CE0009A2B8D6A27F38333925418D458649B738
:109CF00050003D86499A83B75000C60A5A26FD8413
:109D0000F7B75000C6615A26FD8A08B75000C6064C
:109D10005A26FD8649B750003D8D25CE03590926A8
:109D2000FD8D2B26C17A008526C120B18D2026AD60
:109D300020B48648B75000D684BD8E08F760003 93D
:109D40008608B750003D4FB75000B76000398640D5
:109D50008DE2C6035A26FDF658008DEA96838130BF
:089D60002703D58339C58039C2
:109FF00097FE87FE008087FE80B688BE991487FEA4
:0000000000
```

APPENDIX 2

The following is an Intel Hex memory dump of the computer program for the mobile unit for an MC3870 microcomputer according to the invention.

```
:1F0000001A2805E36F655C675D8FFB201C857055B173F584054C13135E4DA45471903893
:200020001E05A05234B117E39105206990054253206487411851715438011D1B1CE3810711
:200040004253206D9003206FB742E152C24519C55538011D1B1CF4C68203C6564719C75790
:2000600076F412EC5C451F551594A64D475D465C28066028064270280503E36F605C635C6257
:200080005D8FF9076D20175E715C7458775A202A36B71B902A63C04C198203CC5C4E8FF872
:2000A000624B12EB142101507EFB8406230EB402304CC091025C4ECC20F68202135C70C8D0
:2000C00081FD745902E55045067136813CE4028402125B7156F084083716E7940357381068
:2000E000031316506CB4AF623C77FD4C94091F252694042902C45C0B00E050C04C19CC5C15
:20010000626F201E90B090B7F0840AC75772E79404577558031394476368200TED5B101647
:200120005040D23095B1016C0504D232A5B1016C0504D23445B1016C0504C236F5B1016C0D6
:2001400013250A9206254482051804770765304C211F8418128421626E7FCC7C9202785BCD
:20016000656A70CCB40271EBB59C9C676F70CCB4E73C94E41A9069676E70CE94EDA691079B
:20018000EEB1041A905665A0138104290520138104290526676C13FC659128138120 6A7087
:2001A000CCB4106D4C250E92111F5C1A280642270077A1159108290378A1159104706D5C34
:2001C00090A8706BCC84FA1AA1131572912BA721031F542806673481FB90EE20156E5C6E43
:2001E0003C9404290077A721035464B4C141324066F5CCC3481FD5C7158201F504B5170520C
:200200001B903F676D203F504C15185A21E01259656A4DEC54841428062C6F4C53410B4C41
:200220005243181FC282031FCA5A4952656B70CEB402725170CC840271C1514A21FCC151BB
:200240007F6768FDE2524C536B604C625EBFFB2044502805EB2806A1445D455C280678623A
:200260006D134C198203CC5C4EBFFE7019502B068F2B06843494E9280667628280A01142060
:20028000555D5D5D778E168FFB5C687552785353494FE411851EC141314135074E0B00F96
:2002A00036201C3294EA75524CCC195CD620193394DE7853A00A1F0B252620169402280561
:2002C000E32900771A2806787434280068F502806840CC3C3532153581077BA250282094326
:2002E000231353422340524213580636266D4C1 98203CC5C4EBFF83494D22806A144ED94051A
:2003000045EC84042900776D674C605E8FFB626A4D1F94054C1F84184EE194054CE08410BC
:200320007FF32E0ED94DE4CE284054C1F94D6684D235F94D03CB41B3C84312806603CB4A9
:20034000A3CB4253C94BE70656B5E8FFE73592901F974582806602902036 76E70CC9404C6
:2003600028064270 5D5C909D29050 C451381967F656D5C20A05B90261A2806421 8B6B70BB
:2003800CC84186E4C5128061F6BFC94075EBFFE6990246F4C526E4CO B4C5390296870CDC1
:2003A00084156E4C1F2137 5C5128061F6F4E25234C0B425C9010715C6E20305E676D4C1564
:2003C00066685C52532805F6595A202C503805EB904745B446B4A05871F8CC0C0500B644CC0E
:2003E000B03548BE1910A49181F491959399 00BE151491824FF4919592B45B446B4A02101F4
:20040000C0C0500B644CB0491894074ACB220590542B0F35844980FC45B446B4A05871FB19
:20042000C0C0500B644CB03548BE1910A44A181F4A195A3A900BE1514A1824FF4A195A2B4591
:20044000B446B4A05471F4C0C0500B644CB0354A18940749CB8205900C2B0F2903D20C8F1E
:20046000DF15810A42E394042806C9900E7EB54318940B28064 2A115B1FA7EB5656F42533C
:200480005C2B05976B4B1884026A44EC5C68445EC5C6E4C0B4C526568 4C5428062C6E4CC2
:2004A000E1842B411F2137 5 14218C3920F410B4218CC921A431BCC8215900D410B421BCCFA
:2004C00082064318CC8207652805979 0CB6568 4C5428062C6E4CE18420410B4218CC3920F50
:2004E0004C18C2B2144C18C3920F435C900B4C18C292F84C18C382F32B05E34B1B840570B6
:2005000005C9 0312084 5B5 02805EB9 0546568 4C6FFC84215420445B50 2805EB2806679 0307E
:200520001A694EFC94 221A6A70 CC941C68CD94 072B064229007770 CCB40C4C139402715E5B
:20054000FD84F89 0036 84C5 420 84 5B502805EB2806 2C6E4CE1410B4D5294036 56F4C53280E
:20056000 05F62B2B45B446B4A12101C0C0500B644CB00F0FB0EF3594EA0C8FE91591147E3D
:20058000B5656E4CE19 407CB8104280642694D1BFC5C2805E3909D694C5465441 8FC5E8F2F
:2005A000FB69445C1C35461F5692140FA07215C7922D03B0015 7B1B152E38426681C77F6BC
:2005C00098417A6B11C4B1894 09595AA11581089010A115810CA0681C421F900190DB90D681
:2005E000766F1C7EB570B490B17C50656A70CEB40271E0B5701C6468765D1B21028FFB7477
:200600005C676D4C1507 7504 20A5057E15F257B14 21313135670551C656E4C1F2137517762
:20062000F15571840513 3594FD695C1C0E2B061844FC940E4C139402715C411F21375190C5
:20064000F0 0C0820B4502805EB2806 607456705520C01F94FE72E656B03594F52805E30CA4
:200660002 02A900970 9006676B4C14152400 S500F0F1F94FC3094F91C775A70 5253201755BB
:200680002038541C4213C0522165591071 9A50451F2526940320185 50B71F0CCCC5C7019 33
:2006A0001C62687054 54DE4531 2121251E554 4314E3551 552 13E5554114E2E45 4 0A251 402
:1306C00094E5441B5 4451B551C421F9205876C4C15521C96
:10 06F0004 34F 5 05 22E2738 224D4F 544F 524F4C 419A
```

```
:200700000001010201020283010202970293787840202979784876494589
:200720000010202070203078402030784078464850304840758465556649
... (hex data lines, partially illegible)
:00000001FF
```

What is claimed is:

1. A radio control terminal for the secondary stations in a multi-unit communications system for voice and data communications, having a primary station and a plurality of secondary stations each primary station adapted to transmit a command data packet including an address, and each secondary station including a microphone to permit input of voice messages by an operator, said control terminal comprising:
   digitizing means for digitizing a voice message;
   memory means for storing the digitized voice message;
   processing means for appending operator entered voice messages in the memory means to a message previously stored in the memory means;
   conversion means for converting digitized stored message to analog form; and,
   transmission means for transmitting of converted stored messages to the primary station.

2. The radio control terminal of claim 1 wherein said processing means activates transmission of a command data packet indicating an emergency status condition, and activates the conversion means and the transmission means to initiate transmission of a stored message in response to a command data packet transmitted by the primary station subsequent to transmission of the emergency status command data packet by the secondary station.

3. A radio control terminal for the secondary stations in a multi-unit communications system for voice and data communications, having a primary station and a plurality of secondary stations each primary station adapted to transmit a command data packet including an address, and each secondary station including a microphone to permit input of voice messages by an operator, said control terminal comprising:
   converting means for digitizing an analog voice message into a digitized equivalent voice message and for reconverting a digitized equivalent voice message into an analog voice message;
   memory means coupled to said converting means for storing a digitized equivalent voice message;
   means coupled to said converting means for reproducing an analog voice message from a reconverted, stored, digitized equivalent voice message;
   said converting means additionally enabling the playing of a stored digitized equivalent voice message in response to completion of storage thereof.

4. A radio control terminal for the secondary stations in a multi-unit communications system for voice and communications, having a primary station and a plurality of secondary stations each primary station adapted to transmit and receive both a command data packet including an address and voice message, and each secondary station including a microphone to permit input of voice messages by an operator, said control terminal comprising:
   means for receiving a command data packet from the primary station including a record command and an address corresponding to the predetermined station address of the respective secondary station; and,
   memory means for digitizing and storing voice messages transmitted to the secondary station by the primary station in response to said record command receipt.

5. The radio control terminal of claim 4 wherein the memory means further comprises means for storing up to eight unique primary station transmitted messages.

6. The radio control terminal of claim 4 further comprising means for indicating that a message transmitted from the primary station has been stored but not played.

* * * * *

UNITED STATES PATENT AND TRADEMARK OFFICE
CERTIFICATE OF CORRECTION

PATENT NO. : 4,495,647

DATED : January 22, 1985

INVENTOR(S) : Timothy M. Burke, et al.

It is certified that error appears in the above-identified patent and that said Letters Patent is hereby corrected as shown below:

In Column 34, line 24, insert --data-- after "and".

Signed and Sealed this

Twenty-seventh Day of August 1985

[SEAL]

Attest:

DONALD J. QUIGG

Attesting Officer     Acting Commissioner of Patents and Trademarks